US009566890B2

(12) United States Patent
McDowell et al.

(10) Patent No.: US 9,566,890 B2
(45) Date of Patent: Feb. 14, 2017

(54) MOVABLE STANCHION FOR TRANSIT BUSES

(71) Applicant: American Seating Company, Grand Rapids, MI (US)

(72) Inventors: Keith A. McDowell, Belmont, MI (US); Andrew Hartmann, Grand Rapids, MI (US)

(73) Assignee: American Seating Company, Grand Rapids, MI (US)

( * ) Notice: Subject to any disclaimer, the term of this patent is extended or adjusted under 35 U.S.C. 154(b) by 0 days.

(21) Appl. No.: 14/614,507

(22) Filed: Feb. 5, 2015

(65) Prior Publication Data
US 2015/0224903 A1 Aug. 13, 2015

Related U.S. Application Data

(60) Provisional application No. 61/937,097, filed on Feb. 7, 2014, provisional application No. 61/942,131, filed on Feb. 20, 2014, provisional application No. 61/992,937, filed on May 14, 2014.

(51) Int. Cl.
| | |
|---|---|
| *A47C 4/52* | (2006.01) |
| *A47C 31/00* | (2006.01) |
| *B60N 3/02* | (2006.01) |
| *B60N 2/24* | (2006.01) |
| *B60N 2/30* | (2006.01) |

(52) U.S. Cl.
CPC ............... *B60N 3/023* (2013.01); *B60N 2/242* (2013.01); *B60N 2/3047* (2013.01); *B60N 3/026* (2013.01); *B60N 2/245* (2013.01); *B60N 3/02* (2013.01); *B60N 2002/247* (2013.01)

(58) Field of Classification Search
CPC .......... B60N 3/02; B60N 3/023; B60N 3/026; B60N 2/245; B60N 2/242; B60N 2002/247; A61G 3/0808; A61G 3/08
USPC ................... 297/183.6, 183.2, 183.7, 183.1, 183.8,297/463.2, 463.1; 410/7
See application file for complete search history.

(56) References Cited

U.S. PATENT DOCUMENTS

| | | | |
|---|---|---|---|
| 2,139,852 A | 12/1938 | Rossell | |
| 2,450,093 A | 9/1948 | Richardson | |
| 2,470,649 A * | 5/1949 | Rossell | ................... B60N 2/242 297/411.21 |
| 3,797,887 A | 3/1974 | Barecki et al. | |
| 4,014,523 A | 3/1977 | Reader | |
| 4,036,527 A * | 7/1977 | Faul | ........................ B60N 2/242 297/232 |
| 4,103,934 A * | 8/1978 | Arnholt | ................ A61G 3/0808 280/751 |
| 4,106,810 A | 8/1978 | Barecki | |
| 4,266,822 A * | 5/1981 | Barecki | ..................... A61G 3/06 105/345 |
| 4,511,171 A * | 4/1985 | Petersen | .............. A61G 3/0808 188/2 F |
| 4,549,763 A | 10/1985 | Wilkerson | |

(Continued)

*Primary Examiner* — Chi Q Nguyen
(74) *Attorney, Agent, or Firm* — Clark & Brody

(57) ABSTRACT

A movable passenger or grab assist is provided for a vehicle. The movable assist finds particular utility in association with a folding seat in a vehicle having a dual-use area, such as a wheelchair securement area adjacent the folding seat. The assist can be moved between a position wherein it can be grabbed by seated or standing passengers and a position that does not interfere with the dual use area when the seat is folded to a storage position.

27 Claims, 37 Drawing Sheets

(56) References Cited

U.S. PATENT DOCUMENTS

| | | | | |
|---|---|---|---|---|
| 5,161,811 | A | * | 11/1992 | Cheng ................... B62B 1/125 280/30 |
| 5,607,089 | A | * | 3/1997 | Strum ................... A01M 31/02 224/155 |
| 5,971,434 | A | * | 10/1999 | Neufeld ................. B60R 21/02 280/756 |
| 6,350,048 | B1 | * | 2/2002 | Stanton ................. B60Q 3/025 362/478 |
| 6,568,735 | B1 | * | 5/2003 | Lohr ..................... B60N 2/242 296/63 |
| 6,799,798 | B1 | | 10/2004 | Mandart et al. |
| 6,974,134 | B1 | | 12/2005 | Macri et al. |
| 7,195,232 | B2 | | 3/2007 | Marshall et al. |
| 7,455,490 | B1 | * | 11/2008 | Goosen ................ A61G 3/0808 410/7 |
| 7,523,993 | B1 | | 4/2009 | Daneault et al. |
| 8,439,622 | B2 | * | 5/2013 | Strong .................. B63B 27/16 114/363 |
| 8,708,386 | B2 | | 4/2014 | Abe et al. |
| 2006/0159542 | A1 | * | 7/2006 | Ditch ................... A61G 3/0808 410/7 |
| 2011/0123286 | A1 | * | 5/2011 | Van Roosmalen .... A61G 3/006 410/7 |

* cited by examiner

MOVABLE STANCHION FOR TRANSIT BUSES

CROSS REFERENCE TO RELATED APPLICATIONS

This application claims the benefit of U.S. Provisional Applications 61/937,097; 61/942,131; and 61/992,937, each of which is hereby incorporated herein in its entirety.

TECHNICAL FIELD

This invention relates to the art of transit vehicles and particularly to passenger assists and seating systems employed in such vehicles.

BACKGROUND OF THE INVENTION

It is common for bus manufacturers to provide vertical stanchions in buses for passengers to grab or hold when standing or when moving into or out of seats on the bus. On conventional two-passenger, fixed transverse seats the vertical stanchion can be readily affixed to the front aisle-side corner of the seat. However, it is also common for a two-passenger transverse seat to be used at one end of a wheelchair securement area. In this case, the seat is typically provided with a cushion that can fold upwards to provide space for mobility aid securement as required by Federal ADA Law. This presents a unique problem because a vertical stanchion pole cannot be affixed to the seat cushion, as that would prevent the cushion from folding up and out of the mandated ADA securement area. Further, if a stanchion were placed adjacent the seat and secured to the floor of the vehicle, it would in many instances intrude into the securement area or into the aisle. Accordingly, it has been the vehicle manufacturer's practice not to provide a stanchion adjacent folding transverse two-passenger seats that are adjacent wheelchair securement areas.

Passengers occupying folding transverse seats or standees adjacent such seats, however, may desire a passenger assist, such as a vertical stanchion to brace themselves during vehicle operation (turns, sudden stops, etc.).

SUMMARY OF THE INVENTION

The invention provides grab assists to passengers in a folding transverse seat adjacent a wheelchair securement area without compromising the space available for mobility aid securement. As used herein, a grab assist is also referred to as a passenger assist.

In one embodiment of the invention, the grab assist is a vertical stanchion that can be attached to the structure of a folding seat to provide a secure attachment when the stanchion is deployed. The stanchion and its mounting structure allow it to be folded out of the way to provide a fully accessible area for mobility aid securement as required by Federal ADA laws. Moreover, the grab assist of the invention can be retrofitted, allowing installation of the invention to seats and overhead rails or other mounting structure in existing transit buses.

In one embodiment, a vertical stanchion pole can be detached from a transverse seat and then folded forward and attached to a horizontal railing above the seats. In one concept the pole simply swings forward and upward. In a second, it telescopes upward and then folds forward. In other embodiments, the stanchion can be folded about an upright axis from a use position adjacent the seat to a stored position closely adjacent the seat that has been folded upward.

The stanchion can be attached to the seat in any of several different ways. The stanchion can also be folded rearward, but in the embodiment where the stanchion is folded about a horizontal axis the forward position is preferred because it is less likely to conflict with standing passengers accessing the overhead rail. This is because the space above a secured mobility aid is generally not accessed by standing passengers.

The stanchion can be deployed when a folding seat is down, in the normal use position. In this position, the folding vertical stanchion and the passenger assist operate just as it would in a fixed-seat installation. While a primary purpose of the vertical stanchion is to assist a passenger in the transverse seat, another advantage is that the vertical stanchion is also available to aisle standees adjacent the aisle side of the seat.

The invention also has application to providing a passenger assist to a center passenger in a rear cross seat, who often faces the center aisle of the bus without any grip assist. Since the central three-passenger section of many rear cross seats (i.e., a seat extending across the rear of a city bus) folds upward to provide access to the mechanical elements below, it is generally impractical to install a fixed vertical stanchion adjacent the center of this seat because it would prevent folding the rear cross seat forward and upward. A movable stanchion according to the invention could have an end affixed to the seat or to the face of the rear cross deck, and the stanchion could telescope upward and fold forward, or simply fold forward for storage on the horizontal rail above. The stanchion would only be folded during mechanical access, and would be then deployed for regular usage as a typical fixed vertical stanchion pole.

While it is desirable for structural reasons, especially on retrofits, to attach a permanent support bracket to the fixed portion of a folding seat, it is within the contemplation of the invention to attach the stanchion bracket to the folding seat cushion corner. In this case the stanchion would be designed to fold upward and store in a compact manner as discussed above.

In accordance with yet another embodiment, a movable stanchion is configured such that it can be rotated out of the securement area when the folding seat is raised. In this embodiment the stanchion is mounted at a position more toward the rear of the seat but configured to have at least a forwardly extending portion that is easily accessible by a passenger when seated in the folding seat. When the folding seat is raised, the stanchion can then be rotated to a position such that the forwardly extending portion of the stanchion extends transversely across the folded seat out of the securement area. This embodiment may be easier to use in some circumstances because the stanchion need only be rotated. Moreover, by extending across the folded seat, the rotated stanchion prevents lowering of the folding seat without first returning the stanchion to an orientation whereby it is available for use by a passenger in the folding seat.

In another embodiment having the stanchion configured to be rotated about a generally upright axis, the stanchion is mounted to the vehicle such that it is in general aligned with the aisle edge of the foldable seat. Thus, the stanchion in this embodiment does not block the aisle because it is mounted either aligned with the aisle edge of the seat or even inwardly of the edge. This orientation can be achieved by configuring the stanchion so that the lower portion of the stanchion extends rearwardly from a position just in front of the seat in its operating position to a mounting bracket below the seat. The mounting bracket can be mounted to any appropriate structure such as the seat base or even the floor of the vehicle.

A significant use for the vertical stanchion is to provide a grab assist for use by passengers in fold-up seats when the vehicle makes a sudden change in motion, such as during an emergency. While known solutions such as seatbelts can have utility, the application and use of seatbelts is not well documented for heavy-duty transit vehicles. Further, use of seatbelts by vehicle occupants is not mandatory and if not used are ineffective. The vertical stanchion approach provides a readily accessible assist that is physically obvious and very similar in nature to those available to other seated or standing occupants on the bus. It is easily seen and remains readily available when needed.

DETAILED DESCRIPTION OF THE PREFERRED EMBODIMENTS

Figure 1:
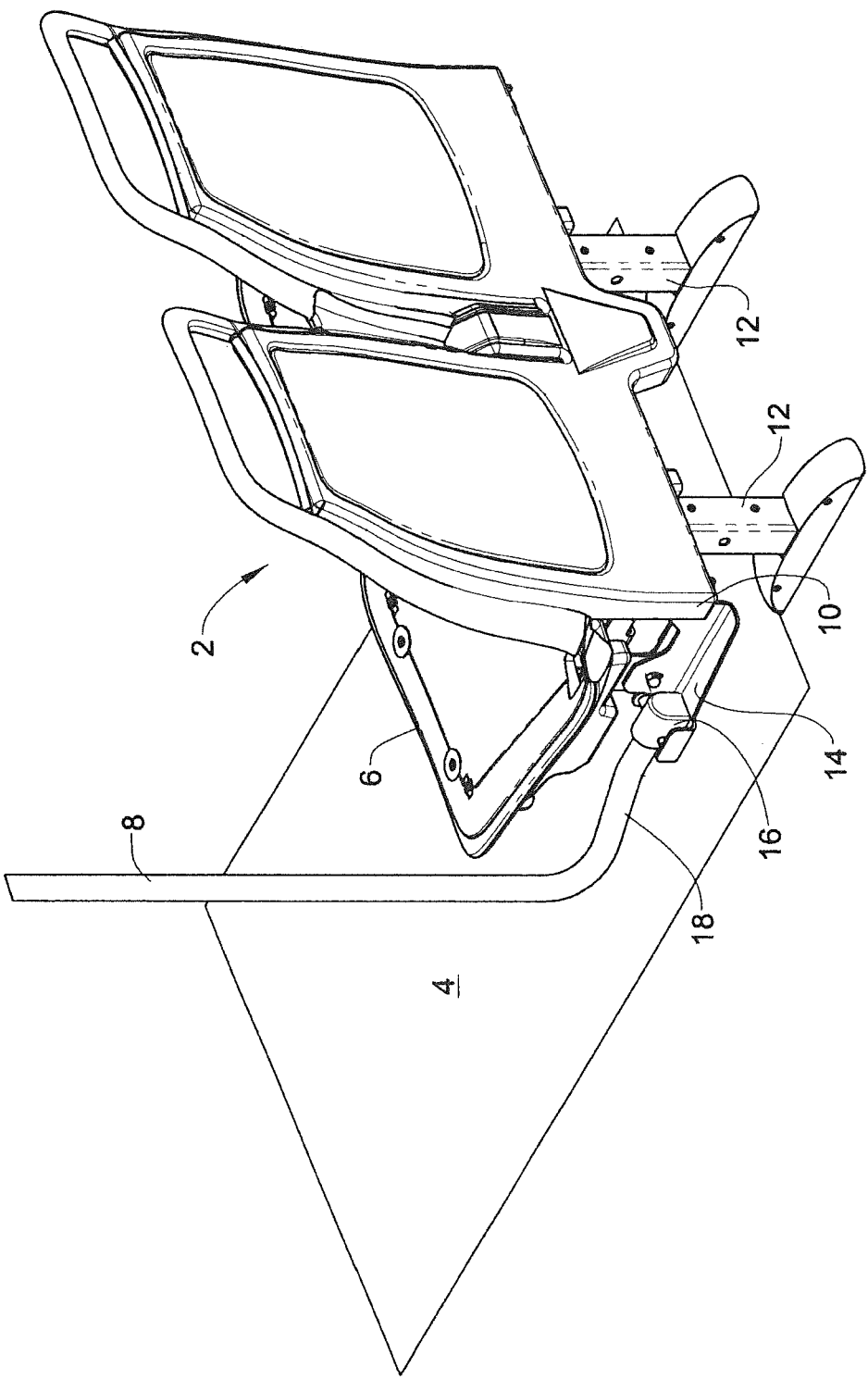
FIG. 1 is a perspective of a two-passenger transverse seat having a movable stanchion according to the invention.

FIG. 1 illustrates a two-passenger flip-up seat 2 that is adjacent a wheelchair securement area 4. The seat 2 includes a bottom portion 6 of the seat that pivots upward to increase the size of the securement area 4 when a passenger in a wheelchair or other mobility aid is to occupy the area.

A stanchion 8 is provided adjacent the aisle side passenger to assist both the passenger in the seat 2 and standing passengers. The stanchion can be used by a passenger in the seat 2 to assist in entering or leaving the seat 2, as by holding onto the stanchion. Standing passengers can use the stanchion to maintain balance by holding onto the stanchion. As well, both seated and standing passengers can grab the stanchion during an emergency, such as one involving a sudden stop, to prevent falling into other passengers or objects in the vehicle. A problem posed by the stanchion, however, is that a portion of it may remain located within the securement area and obstruct part of the securement area to prevent its use by a mobility aid, even after the seat portion 6 is folded up.

As illustrated in FIG. 1, the seat 2 includes a frame 10 that is mounted to the vehicle by two pedestals 12. While other structures for attaching the seat 2 are known and can be employed, this is a standard construction and is shown here by way of example only. In accordance with the illustrated embodiment, a mounting plate 14 is attached to the frame 10, and a support bracket 16 is attached to the mounting plate 14. The support bracket 16 engages the lower end 18 of the stanchion 8, as will be described in more detail below.

Figure 2:
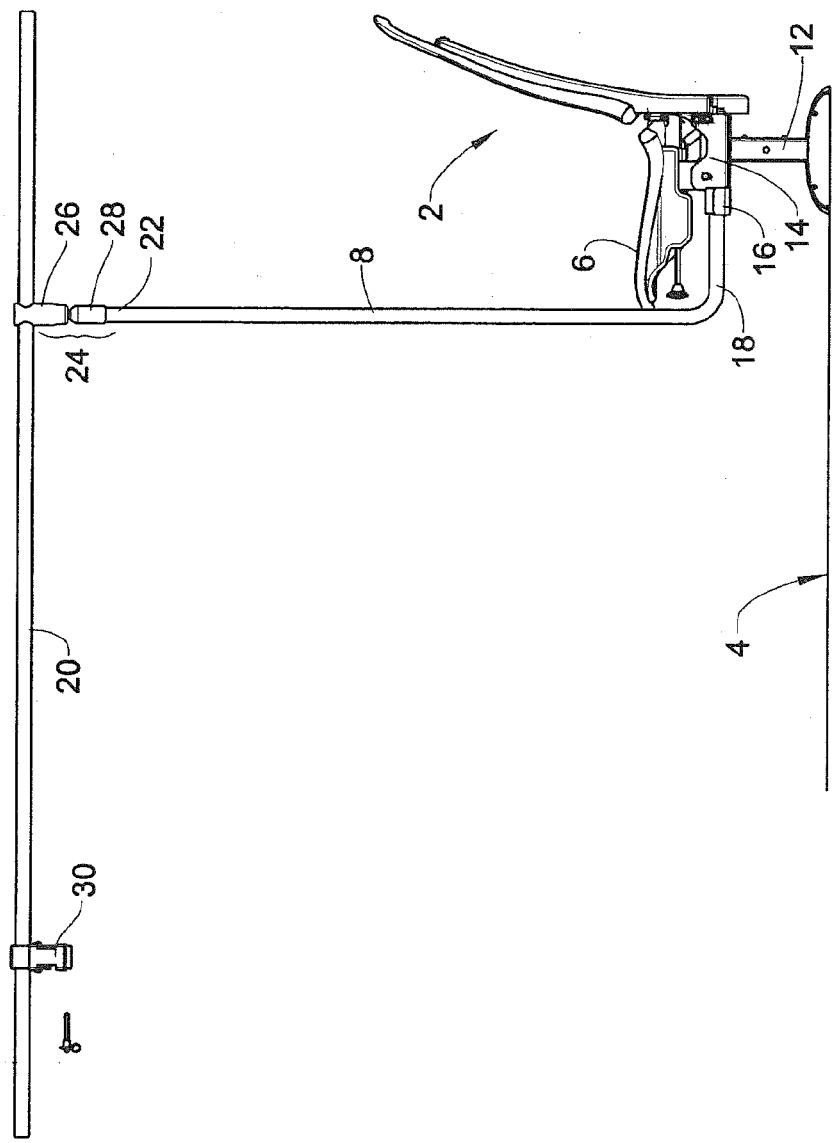
FIG. 2 is a side view of the seat of FIG. 1.
Figure 3:
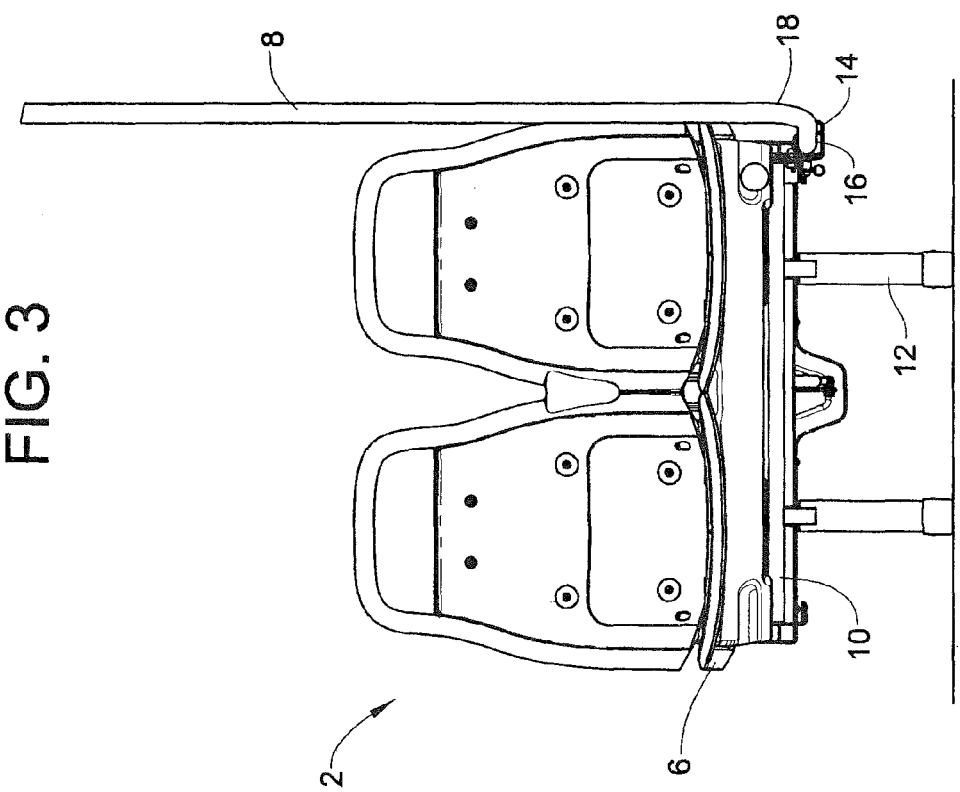
FIG. 3 is a front view of the seat of FIG. 1.

FIG. 2 shows a side view of the seat 2 and the securement area 4, and FIG. 3 is a front view thereof. The movable stanchion 8 is shown attached to the support bracket 16 at its lower end 18 and to a horizontal rail 20 at its upper end 22. The overhead horizontal rail 20 is commonly installed on both sides for the full length of a bus to provide a grab assist for standing passengers. If one is not installed on a particular bus a similar structure or alternate structure could be installed. For example, a bracket could be configured to attach to any convenient part of the bus, such as the roof, a sidewall, or both. Other configurations for engaging and holding the upper end of the stanchion will be apparent to those of skill in the art.

The upper end 22 of the stanchion can be attached to the horizontal rail 20, or similar structure, by a pivoting joint 24. One part 26 of the joint 24 is attached to the rail 20, and a second part 28 is attached to the upper end 22 of the stanchion 8. The two parts 26 and 28 are connected to each other for pivotal motion whereby the stanchion can be pivoted upward when the lower end 18 is disengaged from the support bracket 16. A clip 30 is also attached to the rail, or to a similar structure, to engage and support the end 18 of the stanchion when it is folded up. It is important to note the invention allows for rotation of the stanchion to position the protruding end away from the aisle in the stored position. This is desirable from a safety perspective.

Figure 4:
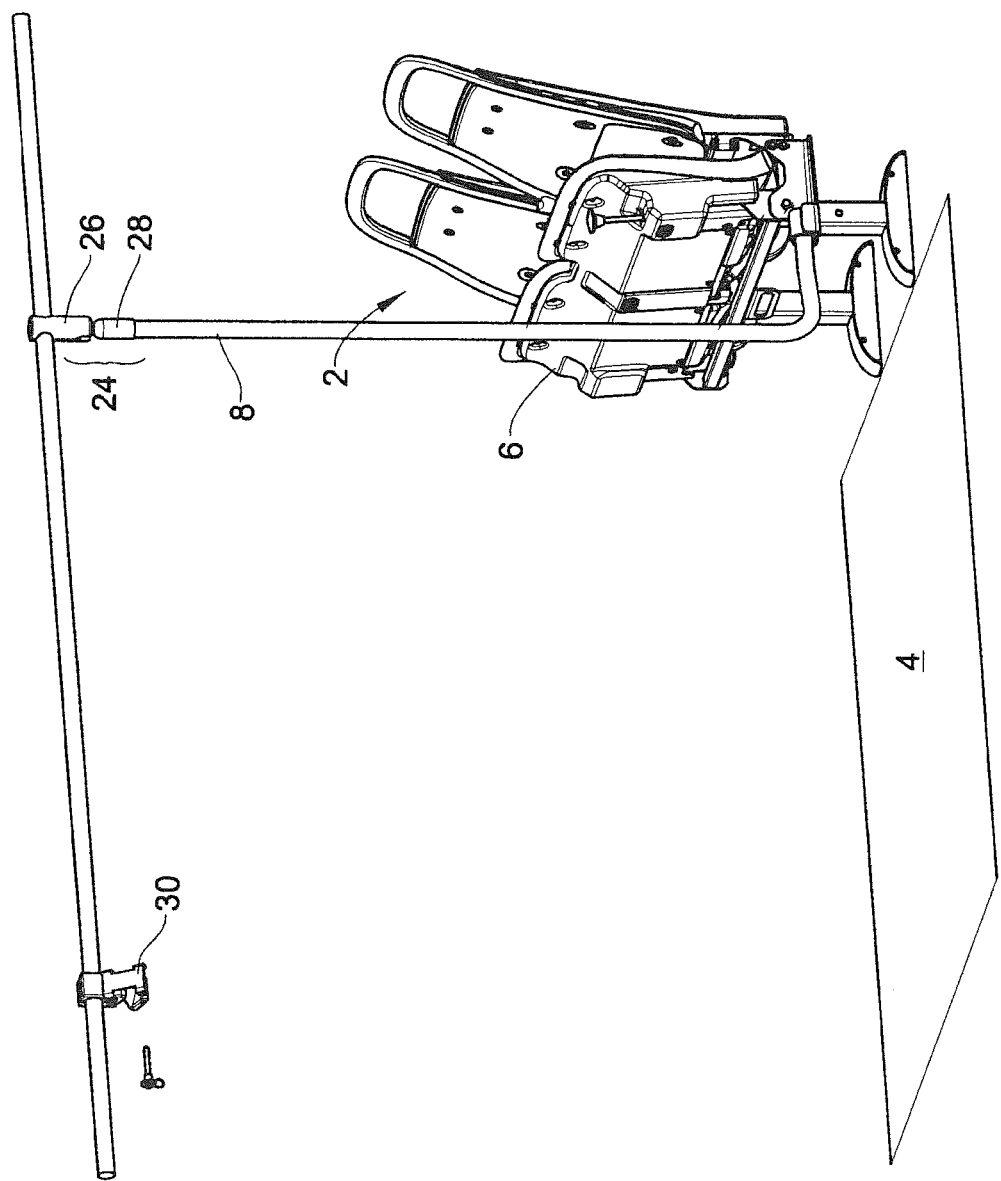
FIG. 4 is a perspective of the seat of FIG. 1.
Figure 5:
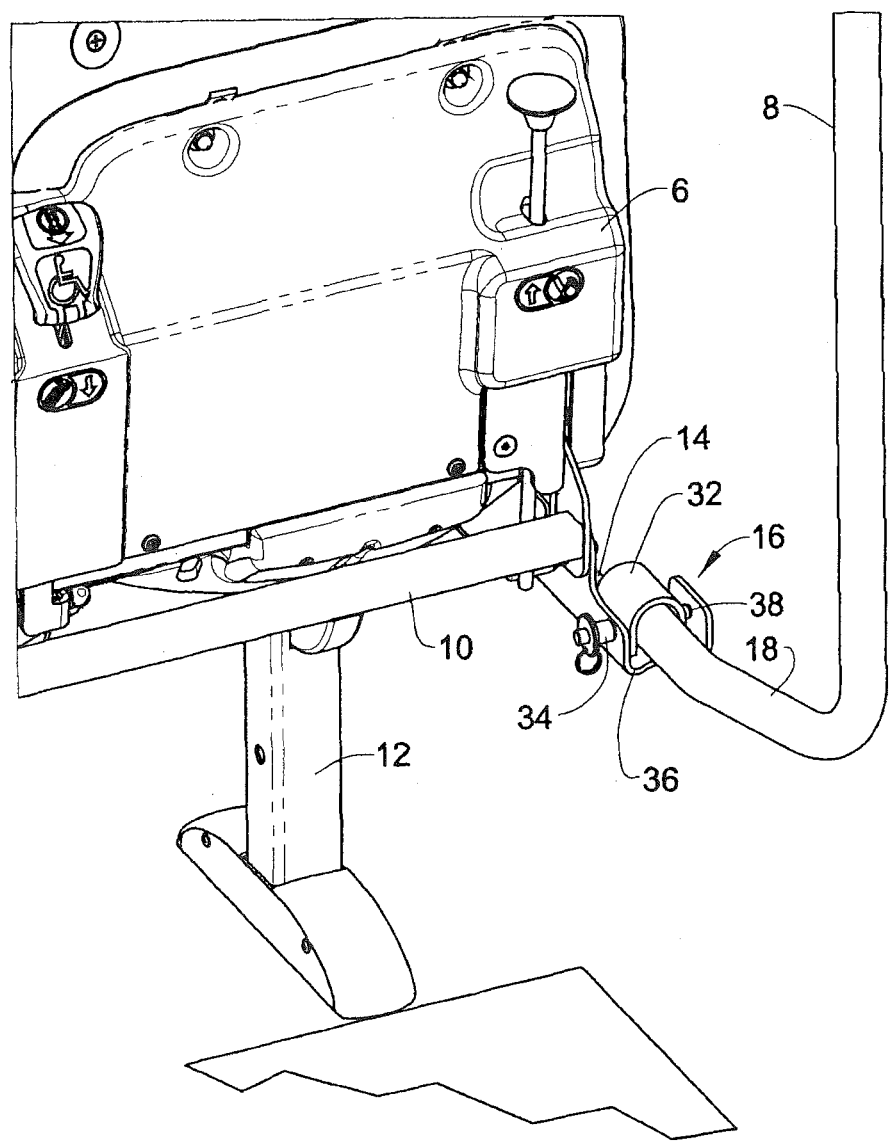
FIG. 5 is an enlarged perspective of the seat of FIG. 1 showing the connection of the movable stanchion to the seat.

FIG. 4 shows the seat and securement area of FIG. 1 in the configuration representing a first step in preparing the securement area to secure a mobility aid (not shown). In this step, the seat portion 6 has been folded up, and the clip 30 has been opened. FIG. 5 also shows the configuration of the embodiment of FIG. 1 in this first step. The support bracket 16 is shown in more detail to include a sleeve 32 that receives an end of the stanchion. The end of the stanchion can be slid into the sleeve in a horizontal direction, but it could be engaged in the sleeve in other ways, as will be explained below.

In the embodiment shown in FIG. 5, the bracket 16 includes a U-shaped portion to which is secured the sleeve 32. A pin 34 is provided to extend through the vertical legs 36, 38 of the U-shaped portion and also through a hole in the end 18 of the stanchion to secure the end of the stanchion to the bracket 16.

Figure 6:
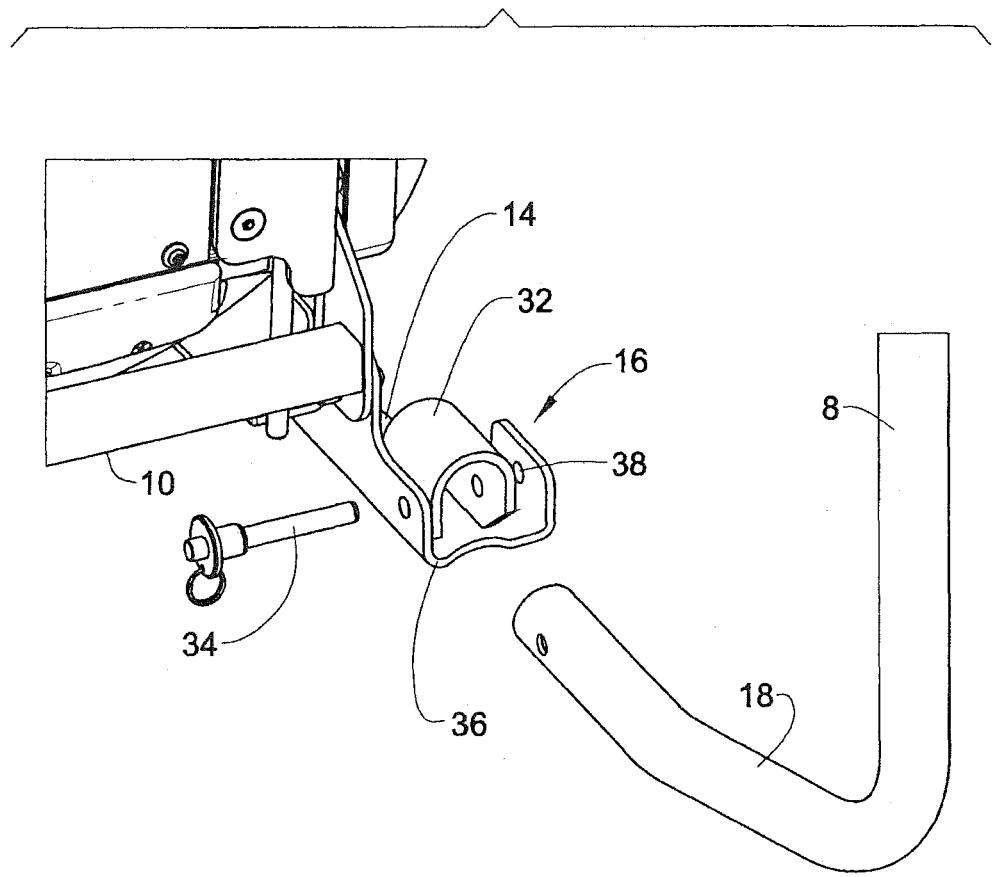
FIG. 6 is a view of the connection of FIG. 6 with the stanchion detached.

FIG. 6 illustrates the positions of the relevant elements after the pin 34 has been withdrawn to permit removal of the end 18 of the stanchion from the sleeve 32 of the support bracket. It will be appreciated that while the pin is shown as an item separate from the frame 10 or the mounting plate 14, it can be attached by a chain, or the like, or it can be mounted in other structure that maintains it attached to the frame or to either of the legs 36 or 38.

Figure 7:
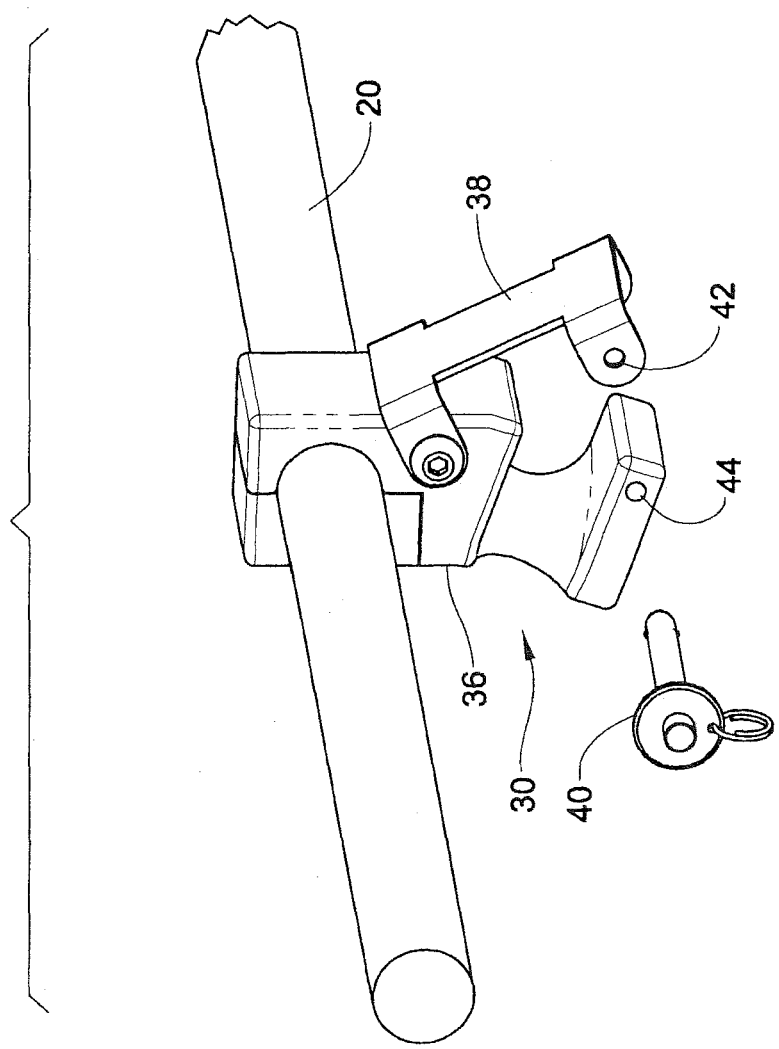
FIG. 7 is an enlarged view of a clip attached to a horizontal rail for engaging the movable stanchion when folded upward.

FIG. 7 illustrates the clip 30 in an opened condition. The clip 30 can comprise a base element 36 that at an upper end is secured to the horizontal rail 20 and at a lower end has a recess shaped to receive the stanchion when folded up. A cover 38 can be pivotally attached to cover the recess and stanchion to hold the stanchion in the recess. A pin 40 can be inserted through mating holes 42 and 44 when the cover is closed to secure the stanchion in the clip.

Figure 8:
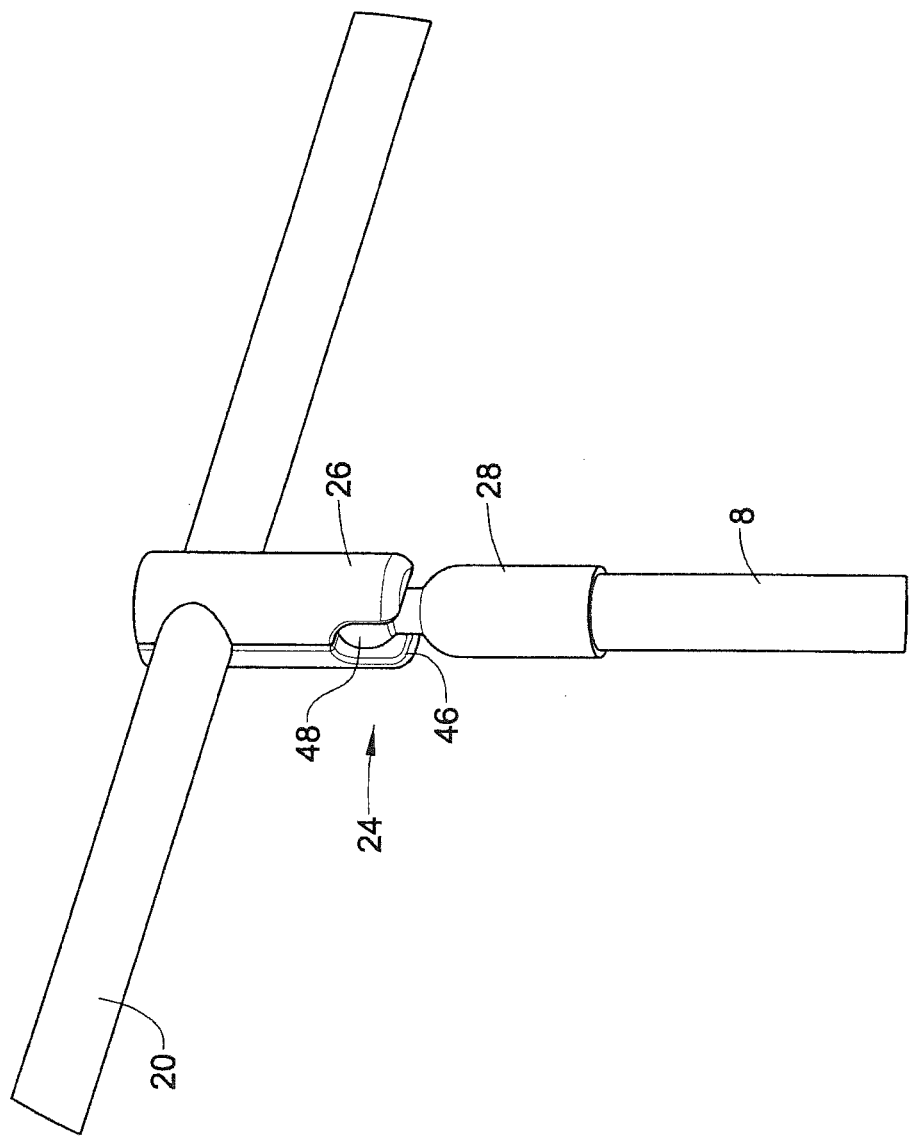
FIG. 8 is an enlarged view of one embodiment of a joint connecting the movable stanchion to the horizontal rail.
Figure 9:
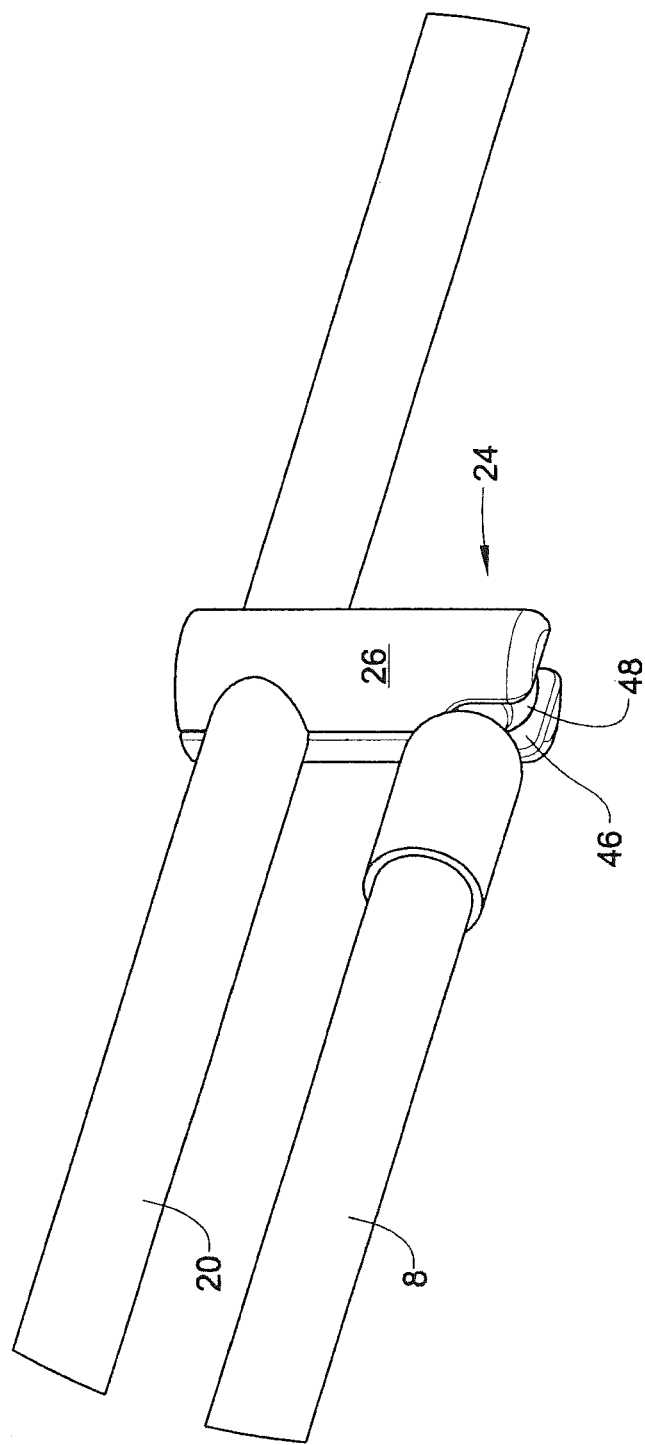
FIG. 9 shows the joint of FIG. 8 with the stanchion in a folded position.
Figure 10:
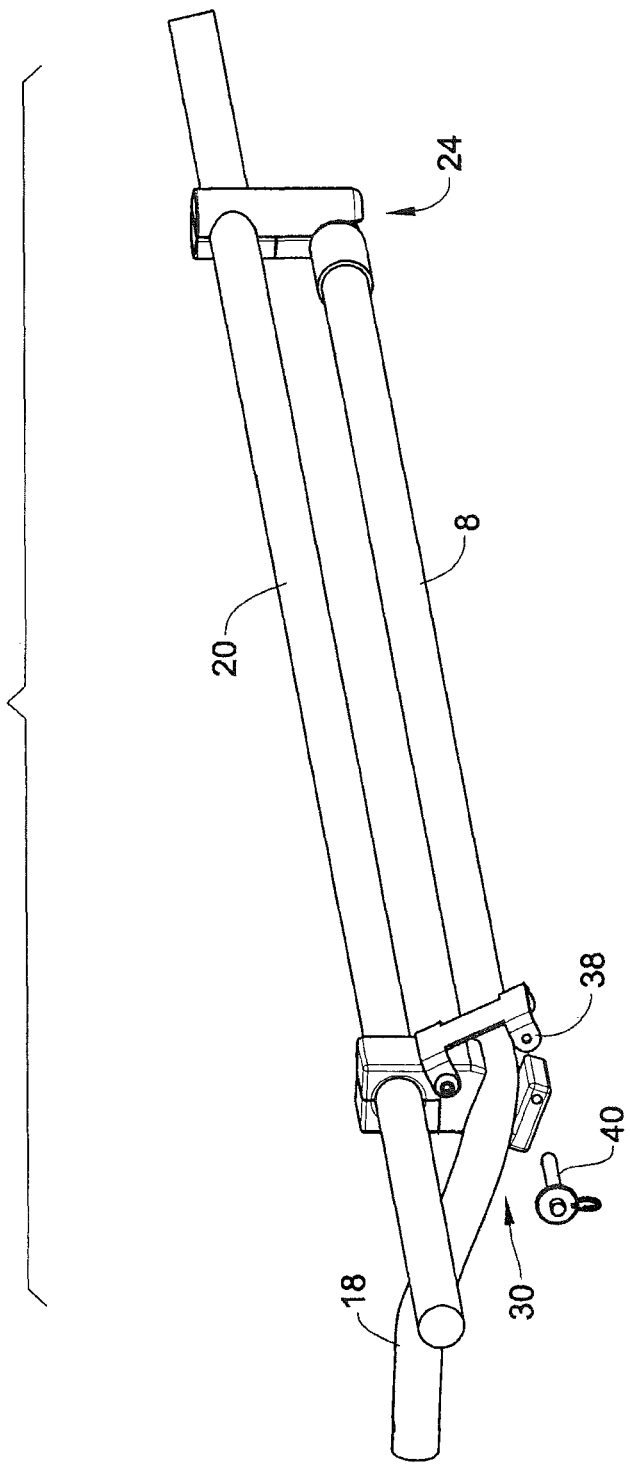
FIG. 10 shows the stanchion in the folded position engaging the clip on the horizontal rail.
Figure 11:
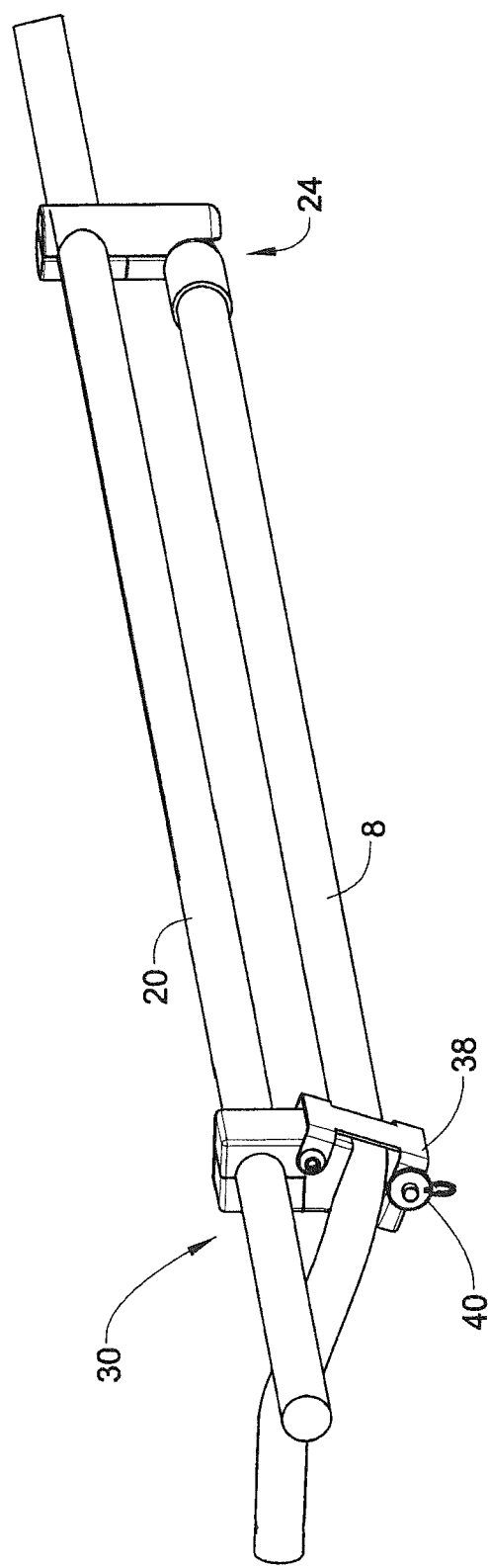
FIG. 11 shows the stanchion in the folded position with the clip in the closed position.

FIG. 8 illustrates an embodiment of the pivoting joint 24. The part 26 can be provided with a spherical socket 46 to receive a ball 48 on the part 28, forming a joint that allows the stanchion to pivot upward as illustrated in FIG. 9. FIGS. 10 and 11 show the stanchion folded up and the end 18 held up by engagement in the clip 30. The ball joint 24 allows the stanchion to be rotated such that the end 18 is out of the way.

Figure 12:
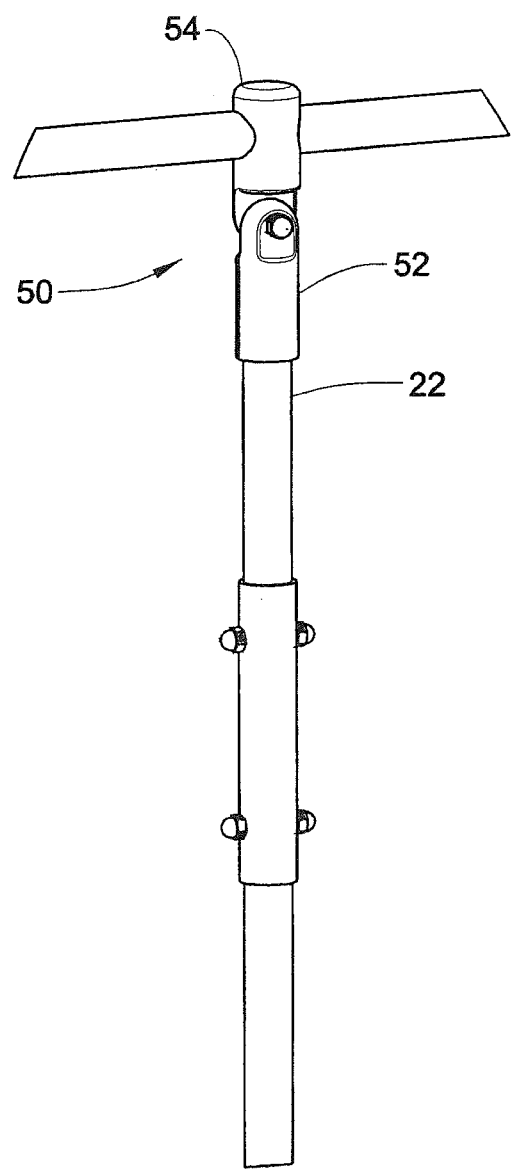
FIG. 12 shows an alternate joint between the stanchion and the horizontal rail.

FIG. 12 shows another type of pivoting joint 50. In this embodiment, the upper end 22 of the stanchion is connected to a lower part 52 of joint 50, and the lower part is pivotally attached to an upper part 54.

Figure 13:
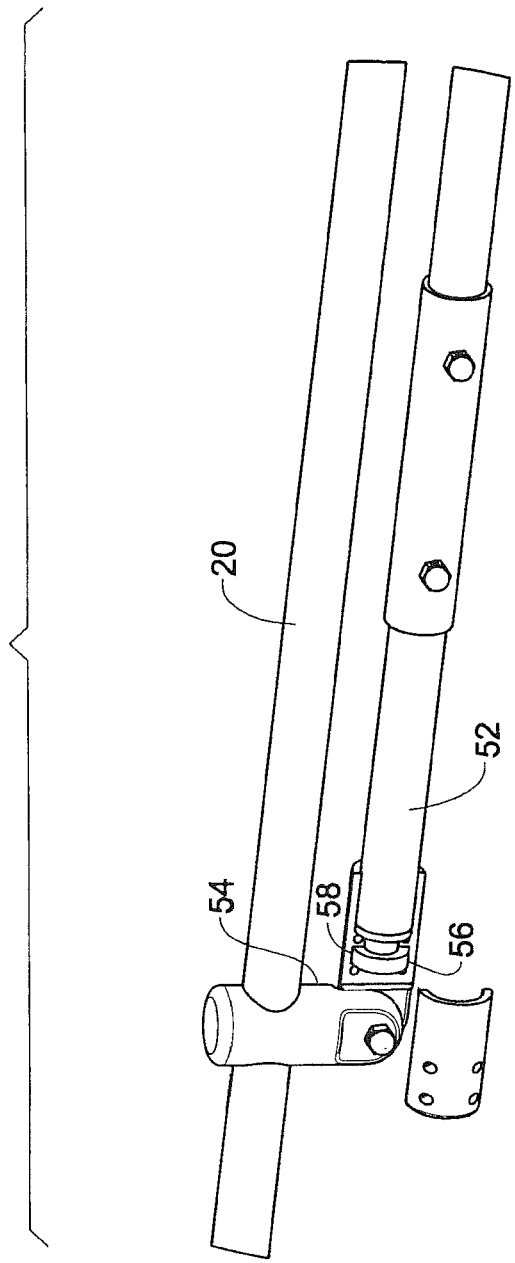
FIG. 13 is an exploded view of the alternate joint of FIG. 12.

FIG. 13 illustrates the interior of the second pivoting joint. In this embodiment, the lower part 52 includes a disk 56 that is received in a slot 58 to allow the stanchion to rotate with respect to the joint. This allows the stanchion to be rotated to a position wherein the end 18 is in a desirable position, as illustrated in FIG. 10.

It will be appreciated that in the embodiment described in connection with FIGS. 1 through 13 the stanchion pivots forwardly of the seat 2. In that embodiment, the stanchion disengages from the support bracket 16 by movement of the stanchion forwardly, in the direction of the folding. In a second embodiment described in connection with FIGS. 14 through 17 the stanchion is dislodged from a support bracket in a vertical motion.

Figure 14:
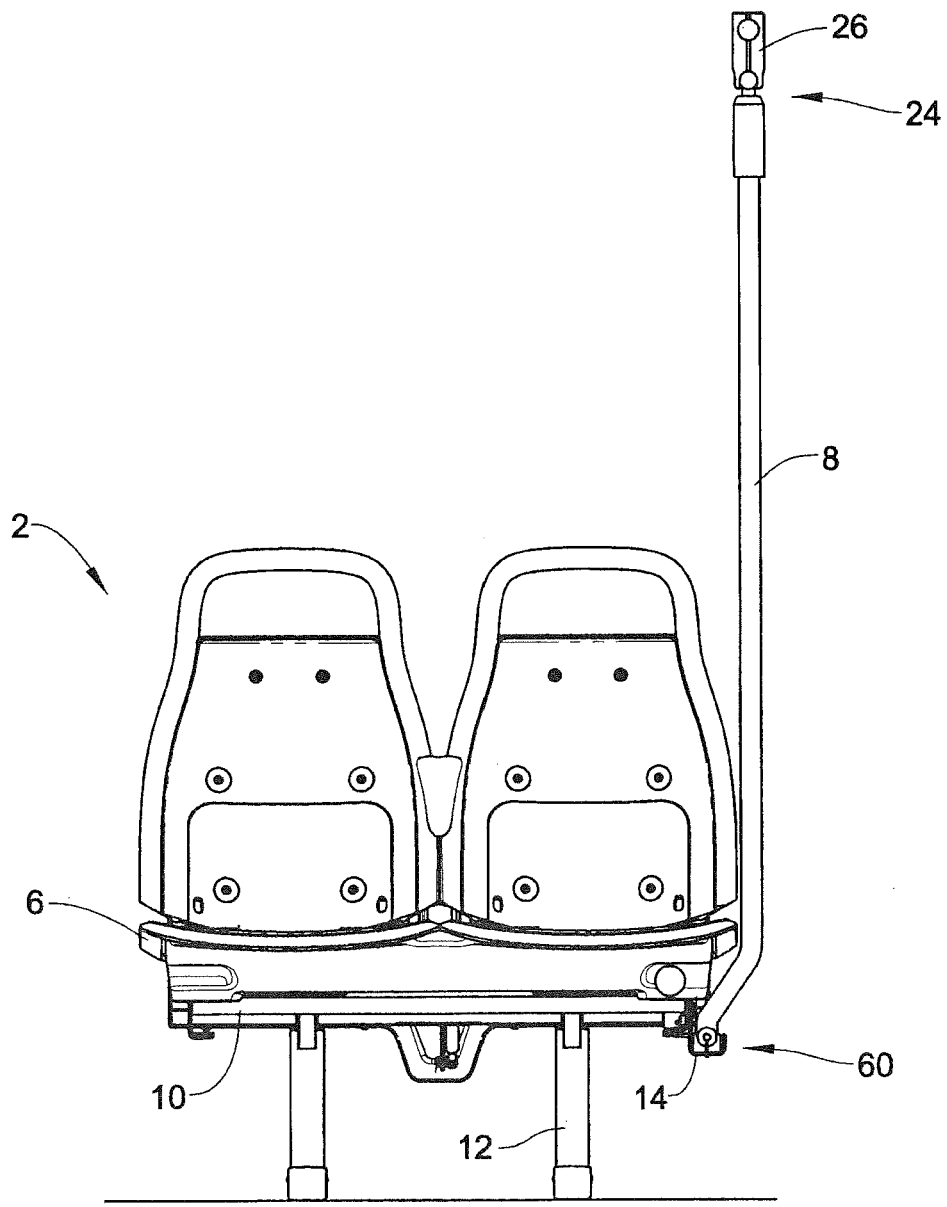
FIG. 14 is a front view of a seat showing a second embodiment of a movable stanchion in accordance with the invention.
Figure 15:
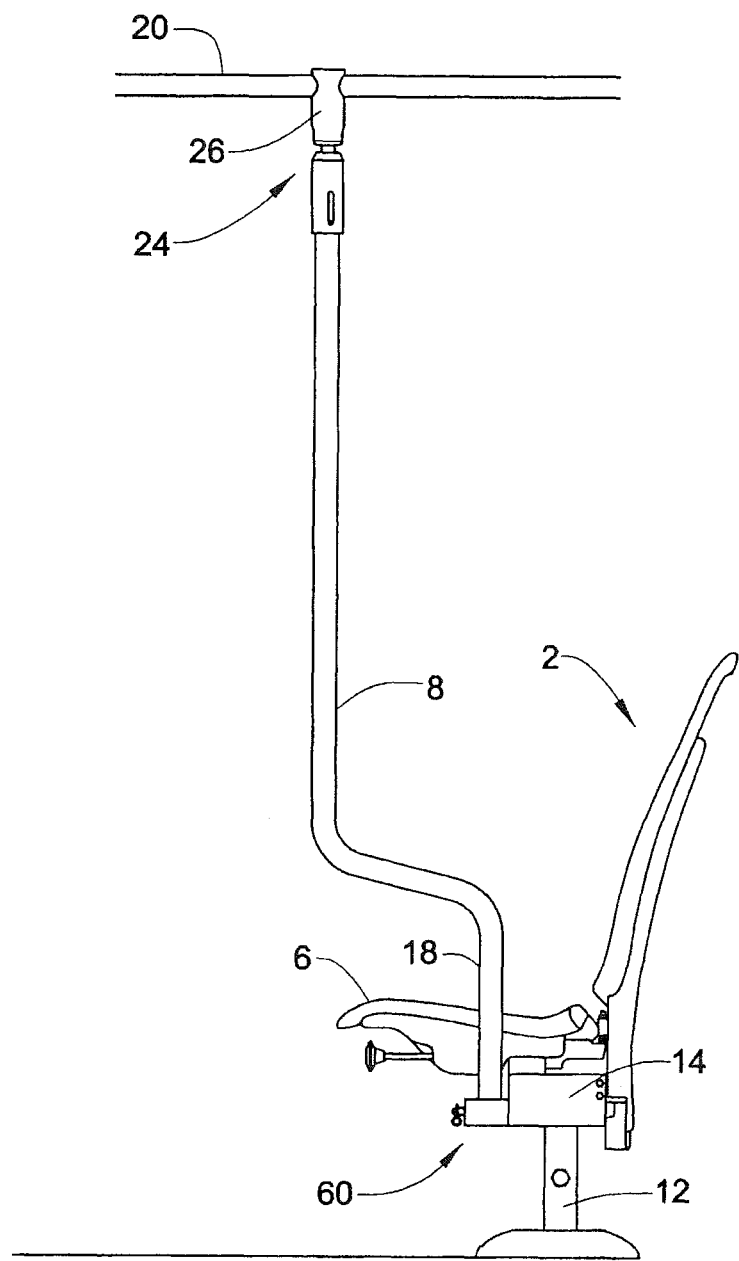
FIG. 15 is a side view of the embodiment of FIG. 14.

Referring to FIGS. 14 and 15, a second embodiment is illustrated, this embodiment having a second type of support bracket 60 and a modified joint 24.

Figure 16A:
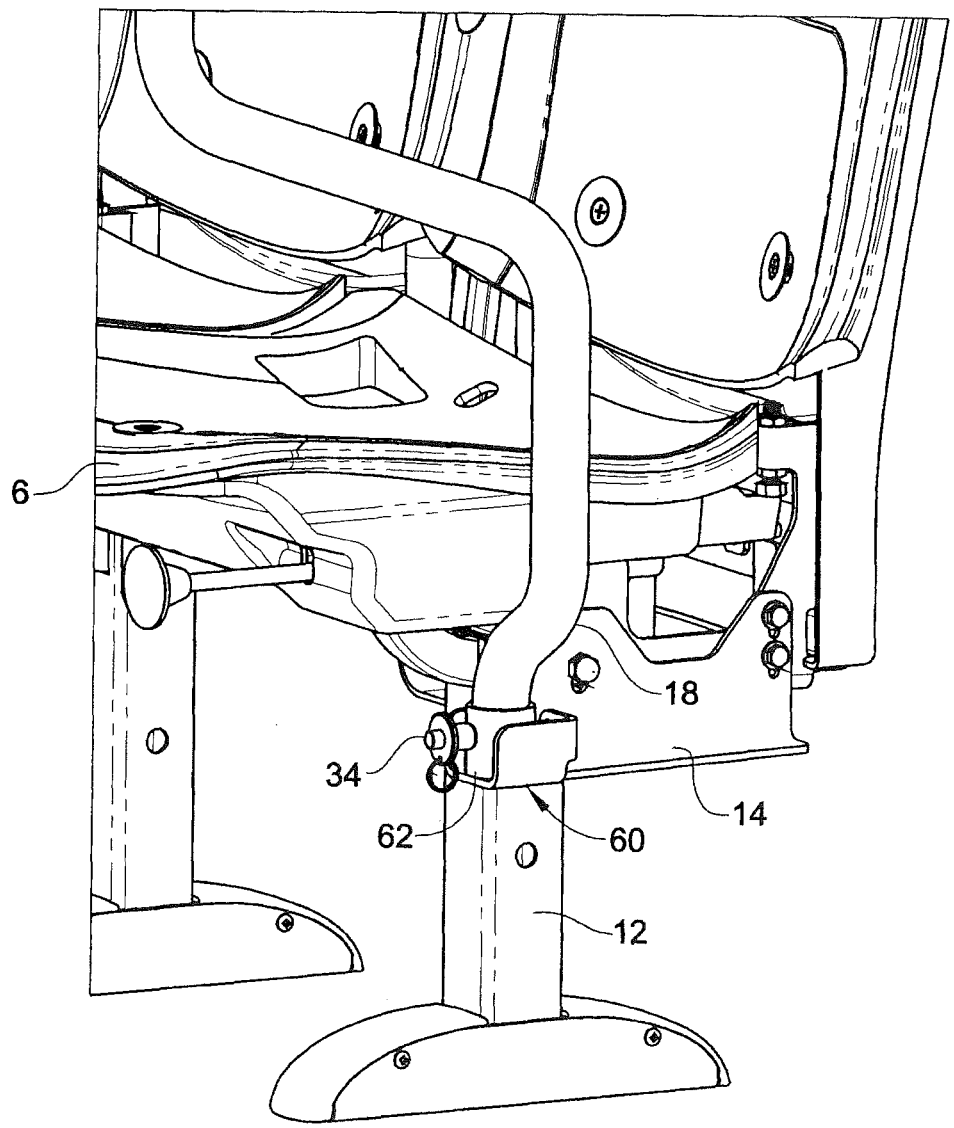
FIG. 16a is an enlarged perspective view of the connection between the stanchion and the seat in the embodiment of FIG. 14.
Figure 16B:
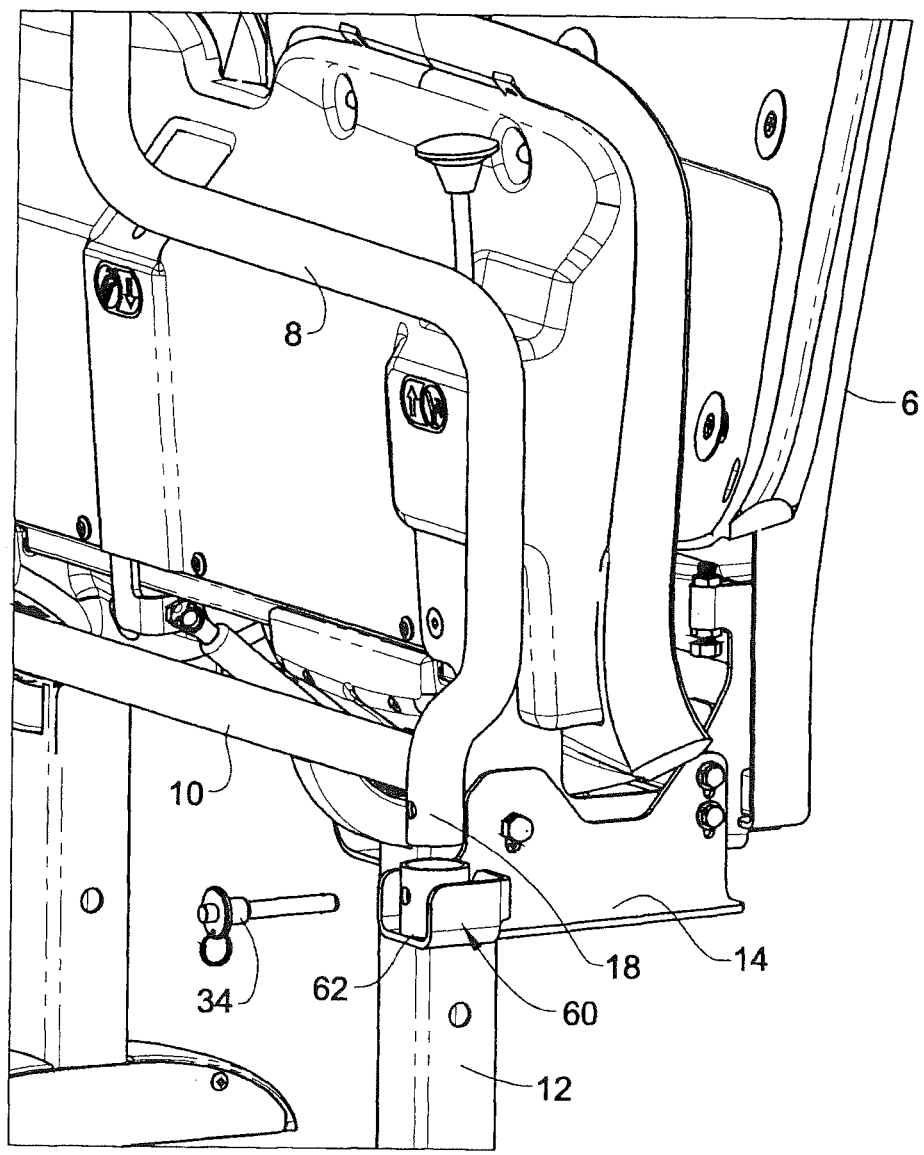
FIG. 16b shown the connection of FIG. 16a in a disengaged condition.

As illustrated in FIG. 16a, the support bracket 60 includes a cup 62 that provides an upward facing opening that receives the end of the stanchion. The stanchion is retained in the cup by a pin 34 as in the previously described embodiments. FIG. 16b shows the stanchion 8 lifted out of the cup 62 so that it can be folded as described above.

Figure 17A:
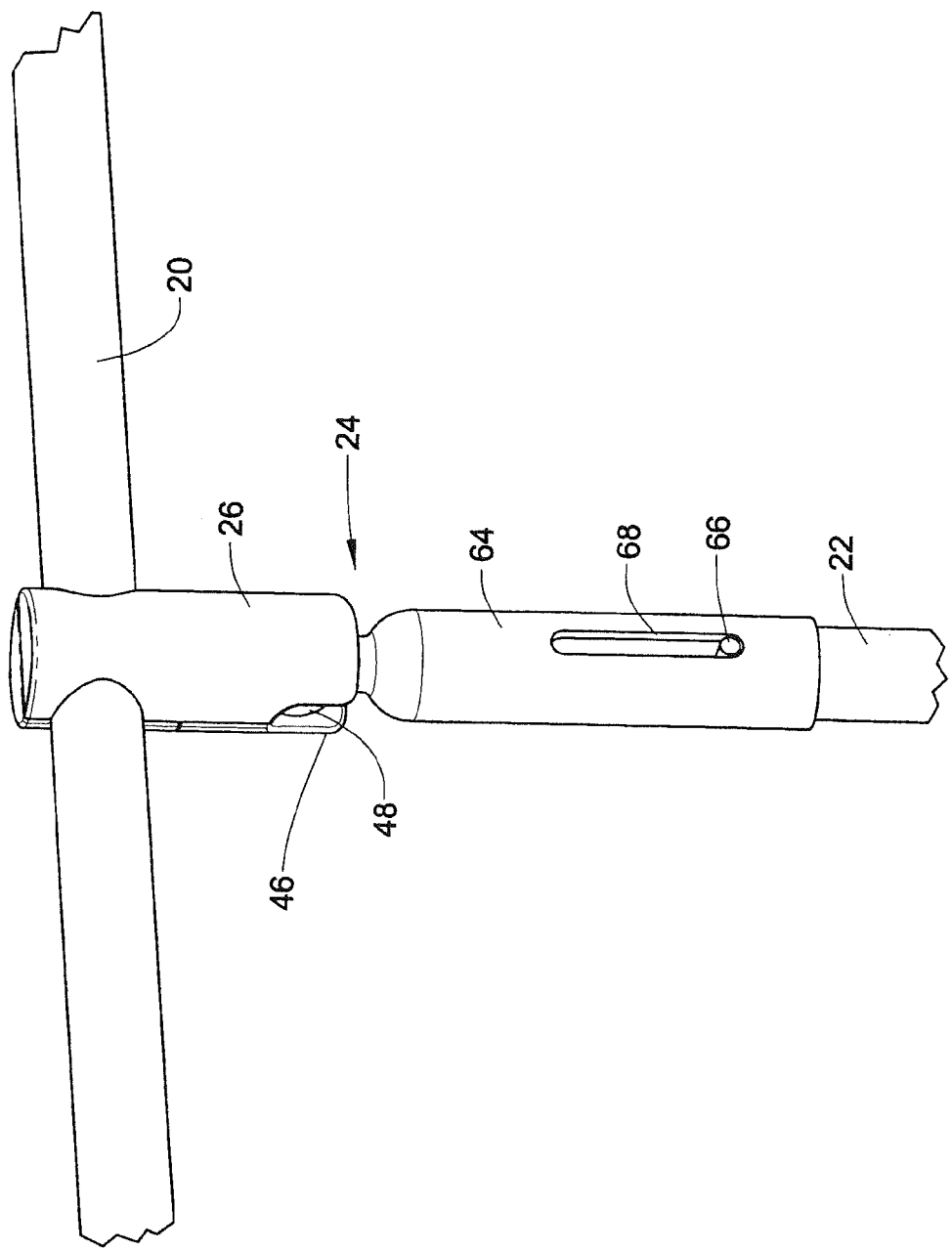
FIG. 17a is a perspective view of a joint connecting a movable stanchion to a horizontal rail in accordance with the embodiment of FIG. 14.

To allow the stanchion in the second embodiment to be moved vertically, the connection between the upper end of the stanchion and the part 64 of the joint 24 can be constructed as shown in FIG. 17a. According to this embodiment, the upper end 22 of the stanchion is provided with a rod 66 that slides in a slot 68 to allow the stanchion to move vertically with respect to the joint 24. FIG. 17a shows the position of the rod 66 when the end 18 of the stanchion is secured in the cup 62, and FIG. 17b shows the position of the rod 66 when the stanchion has been lifted out of the cup, as in FIG. 16b.

Figure 17B:
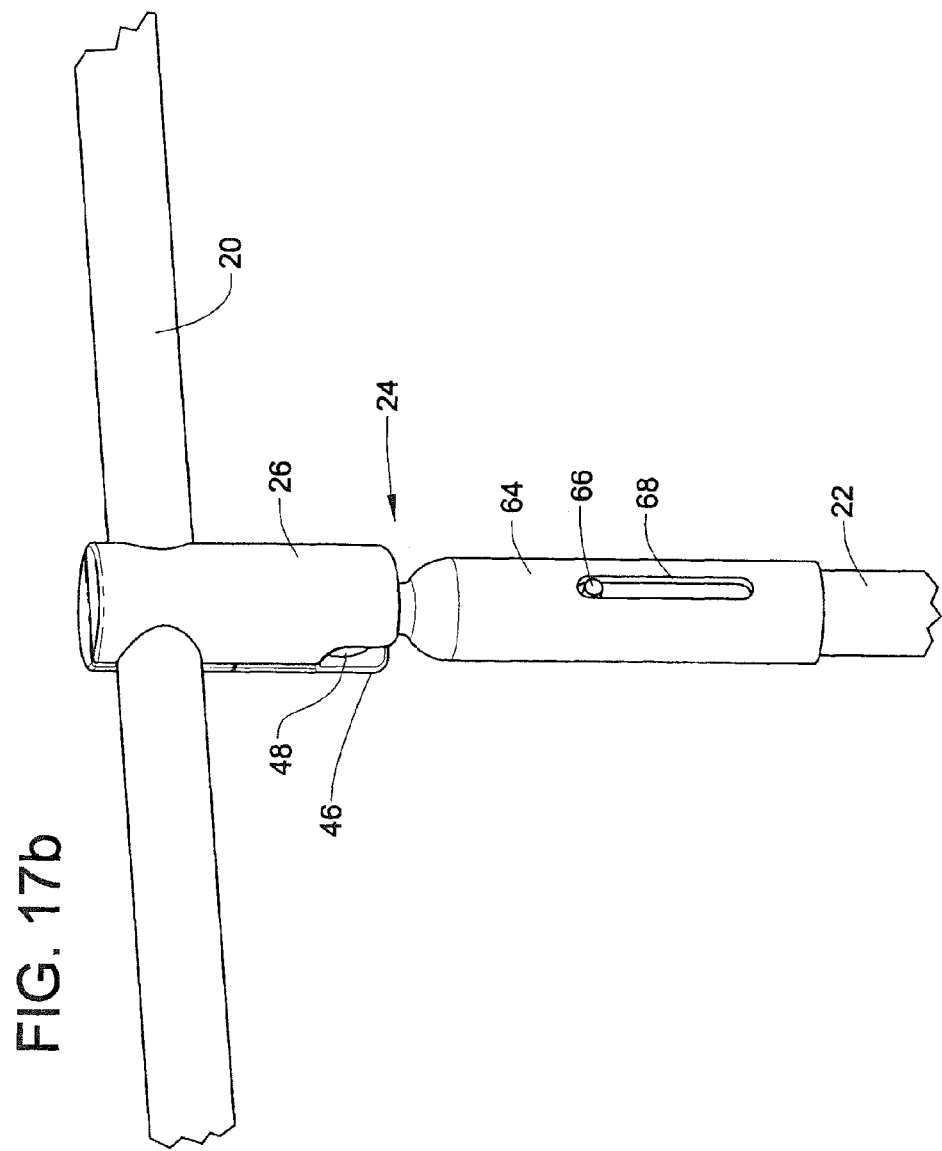
FIG. 17b shows the joint of FIG. 17a with the stanchion in a raised position.

The modified joint 24 shown in FIGS. 17a and 17b would find utility in any modification of the embodiments of FIGS. 1 through 13, if the support bracket 16 were modified to allow disengagement by vertical motion of the stanchion.

It may be noted here that the grab or passenger assist shown in the several embodiments as a vertical stanchion can be configured to extend directly upward from a location near the front of the seat in the down position or to extend upward from a location spaced from the front of the seat but also providing a forwardly directed section that can serve as an armrest to a seated passenger.

Figure 18:
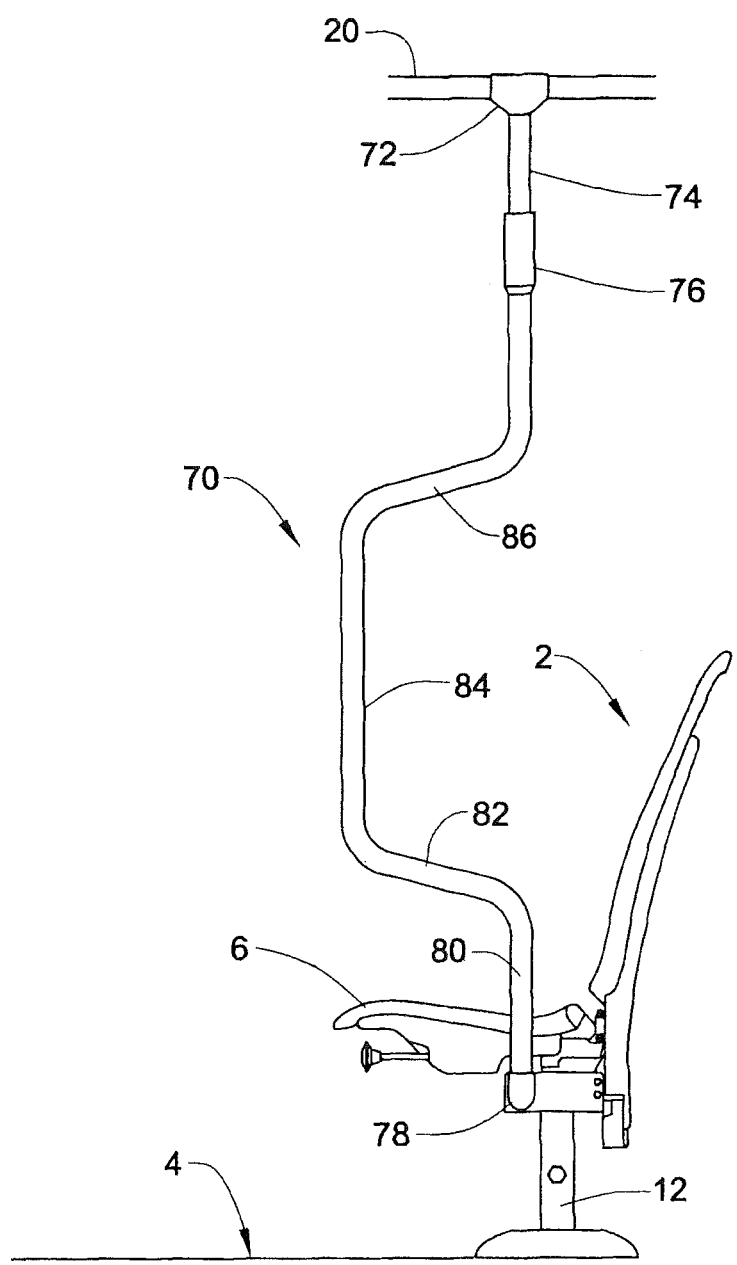
FIG. 18 is a side view of a two-passenger folding seat with a third embodiment of a movable stanchion in accordance with the invention.
Figure 19:
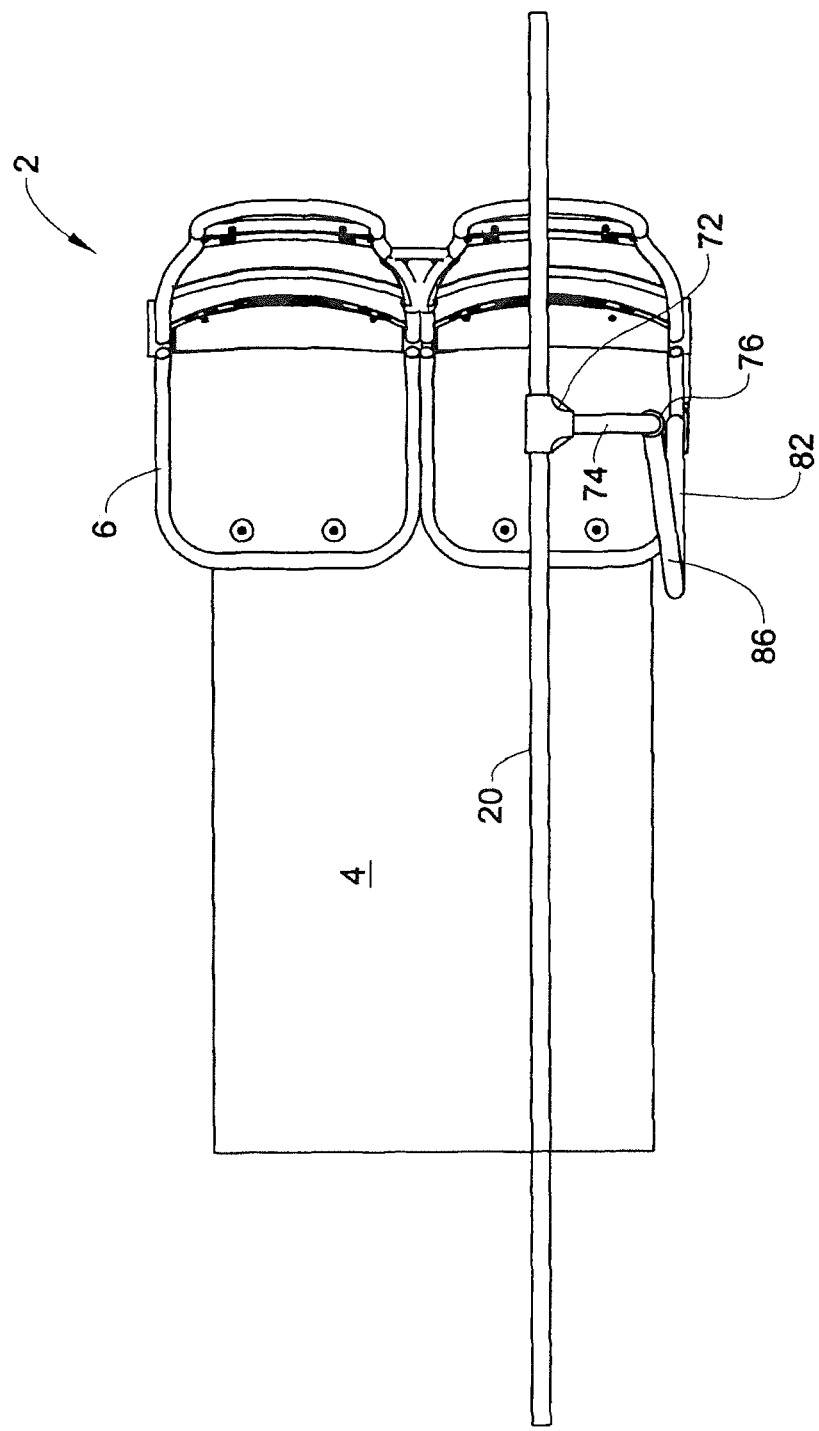
FIG. 19 is a top view of the embodiment of FIG. 18.
Figure 20:
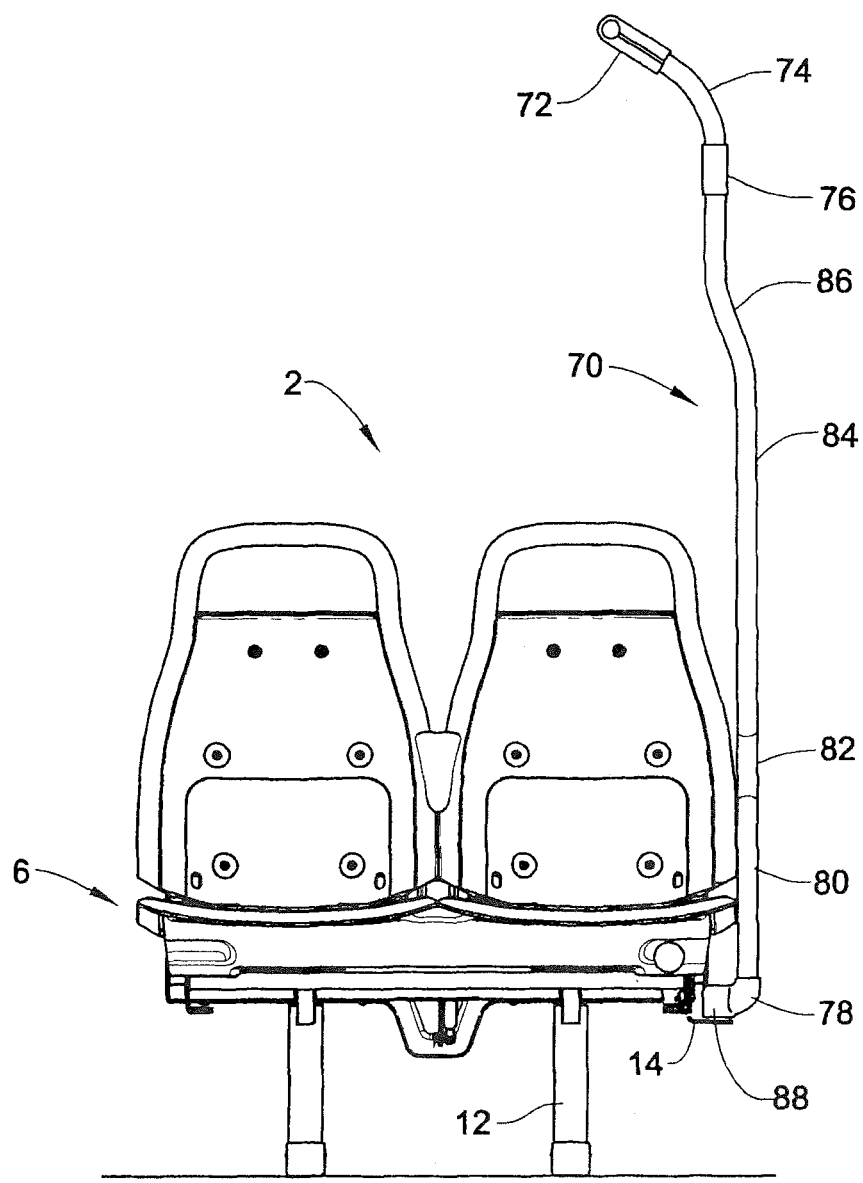
FIG. 20 is a front view of the embodiment of FIG. 18.

FIG. 18 illustrates an embodiment of the invention where a stanchion 70 is arranged to move between operational and stored positions by rotation about an upright axis. In this embodiment, the upper part of the stanchion 70 is attached to the horizontal rail 20 or other appropriate structure, for example by a clam shell support 72. The stanchion 70 is connected to the rail 20 by tube 74 and a collar 76. The tube 74 can be offset from the rail 20 to align the collar with a bracket on the folding seat 2 whereby the stanchion can be rotated about an axis established by the collar 76 and a bracket 78 on the seat, as will be explained below. While that axis is generally vertical in the embodiment other non-vertical orientations are possible. FIG. 20 shows how the tube 74 can be configured to accommodate a transverse offset between the position of the rail 20 and the bracket 78.

FIG. 18 illustrates the feature of this embodiment wherein the stanchion 70 is similar to that shown in FIG. 15 but is further modified to align the mounting bracket on the rail with the bracket on the seat to allow rotation of the stanchion about an axis containing the points of attachment to the rail and to the seat. Thus, the stanchion includes a lower section 80 that is connected to the bracket 78 on the seat. A forwardly extending section 82 extends along the side of the seat 2 and connects to an upright section 84 that is located with respect to the seat to be easily grasped by a passenger. An upper section 86 connects the upright section to the collar 76, which allows rotation of the section 86 with respect to the tube 74. Thus, in this embodiment the section 84 forms a grab portion in easy reach of a seated passenger, while the axis of rotation is behind this grab portion.

FIG. 20 illustrates one method of attaching the stanchion to the seat. In this embodiment one end 88 of a bracket 78 is attached to a boss (not shown) on a mounting plate 14 to allow rotation of the bracket about the axis of the boss, which as noted above can be vertical or have a similar orientation that will allow the stanchion to rotate as will be described below in connection with FIGS. 21-23. The other end of the bracket 78 is attached to the lower section 80 to support the stanchion. In the embodiment illustrated the bracket 78 provides an offset so that the end 88 of the bracket 78 lies under the folding portion 6 of the seat when the seat has been folded down. End 88, however, is aligned with the collar 76.

Figure 21:
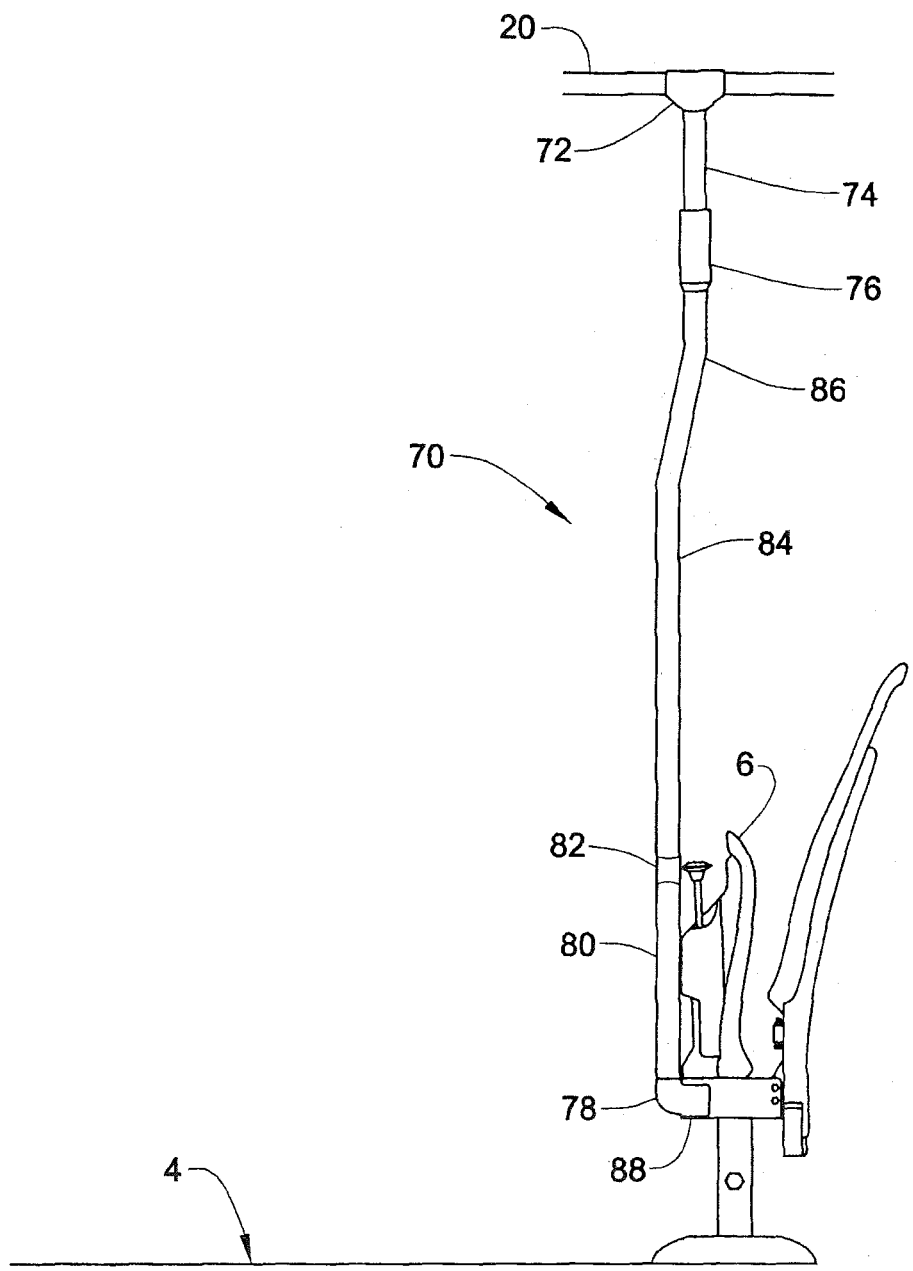
FIG. 21 is a side view of the embodiment of FIG. 18 with the seat folded and the stanchion in a stored position.
Figure 22:
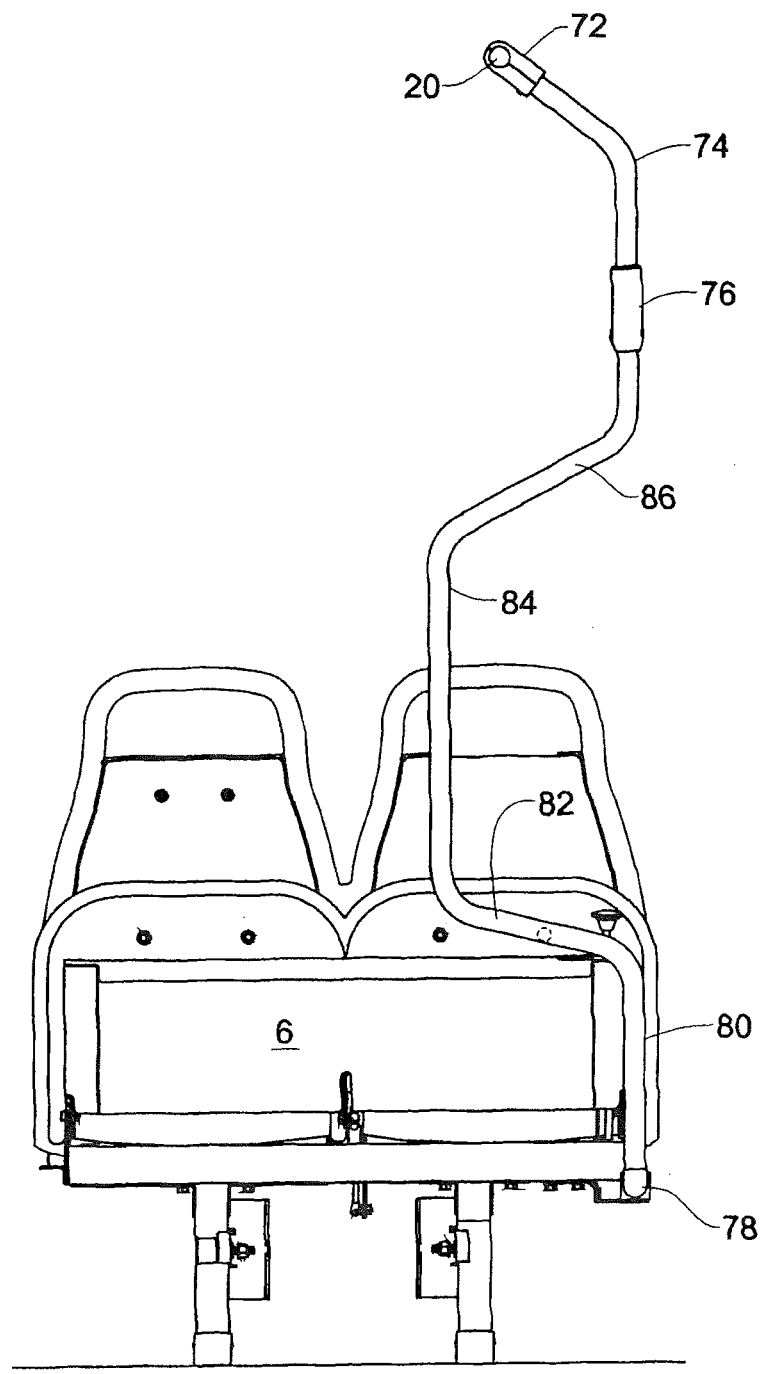
FIG. 22 is a front view of the embodiment of FIG. 18 with the seat folded and the stanchion in a stored position.
Figure 23:
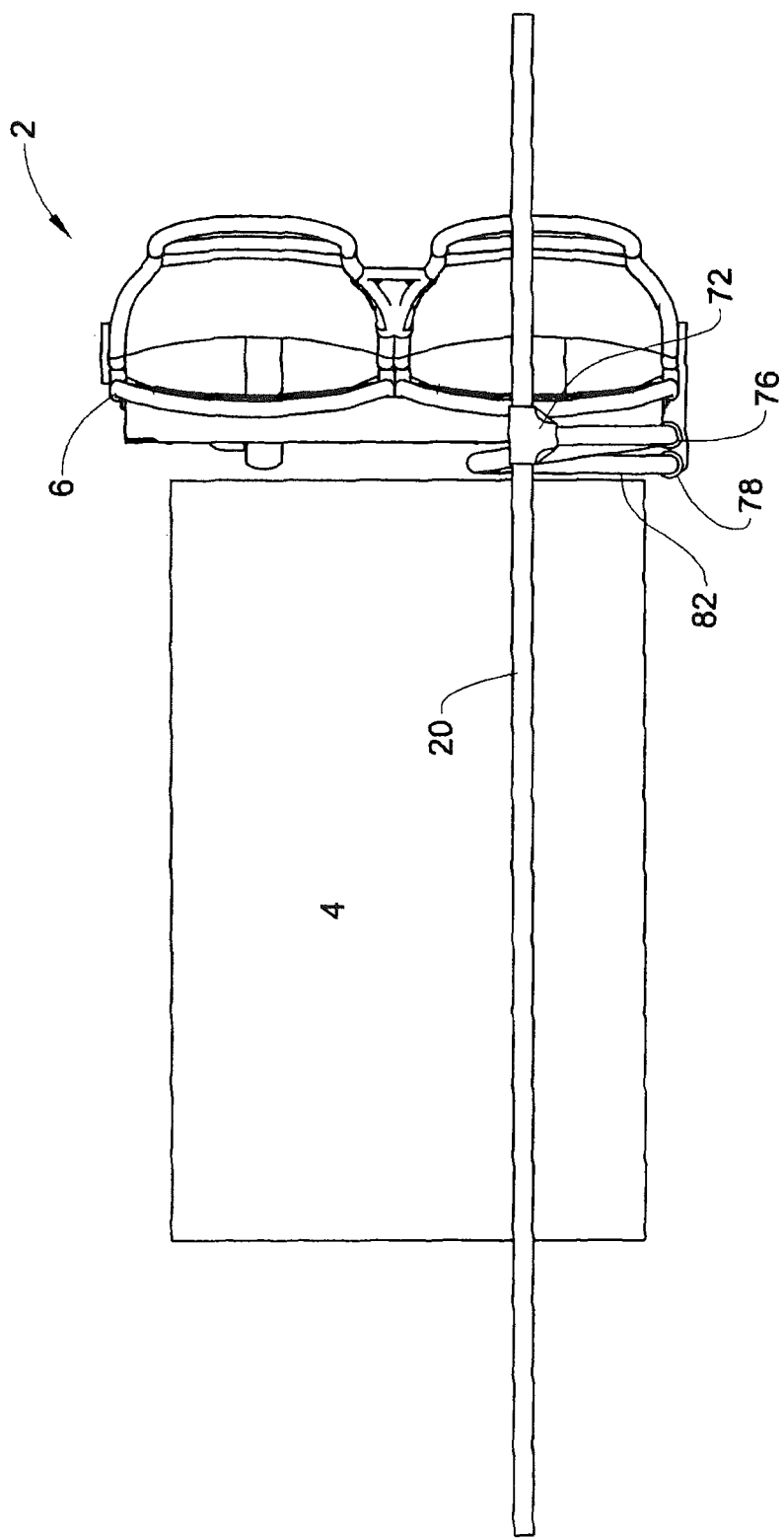
FIG. 23 is a top view of the embodiment of FIG. 18 with the seat folded and the stanchion in a stored position.

FIGS. 21-23 illustrate the position of the stanchion 70 after the folding seat has been folded to the stored position and the stanchion has been rotated to move it out of the wheelchair securement area 4. FIG. 22 shows how the stanchion folds across the folded seat 6 whereby section 86 remains available for standing passengers to grab the stanchion and yet to allow a wheelchair (not shown) full use of the securement area 4.

FIG. 23 is a top view illustrating the positions of the various elements when the stanchion is in the rotated orientation. This figure shows the various offsets that are employed to accommodate offsets between the rail 20 and the stanchion and between the mounting plate 14 and the stanchion. Other configurations are contemplated where one or more of these offsets is eliminated as well as configurations where more offsets are employed.

The bracket 78 illustrated can be of several constructions. For example, it can be a cast metal part, but it can also be fabricated, plastic, and the like. As well, the stanchion can be provided with one or more locking mechanisms to secure it in the positions illustrated in the drawings. For example, the bracket 78 can be provided with a locking mechanism, but the collar 76 could also be provided with a lock, or a lock can be separate from the stanchion.

With reference to FIGS. 24-29, another embodiment of the invention contemplates a configuration wherein the stanchion 70 does not extend into the aisle. In this configuration, an upright section 84 of the stanchion is aligned with the aisle edge of the seat when the seat is in an operational position and can be rotated to lie in front of the seat after the seat is raised to a stored position. In this embodiment, the upright section 84 of the stanchion is positioned just in front of the seat as illustrated by the gap 90 between the vertical location 92 of the seat and the upright section 84. In this embodiment the stanchion includes a modified lower section that extends rearward of the front of the seat to a bracket 96 that receives the end of the modified lower section 94. The bracket 96 rotates to allow the stanchion to rotate as will be explained below. Also, the bracket 96 is mounted to an adjustable support bracket 98, which in the embodiment shown is mounted to the seat frame.

Figure 24:
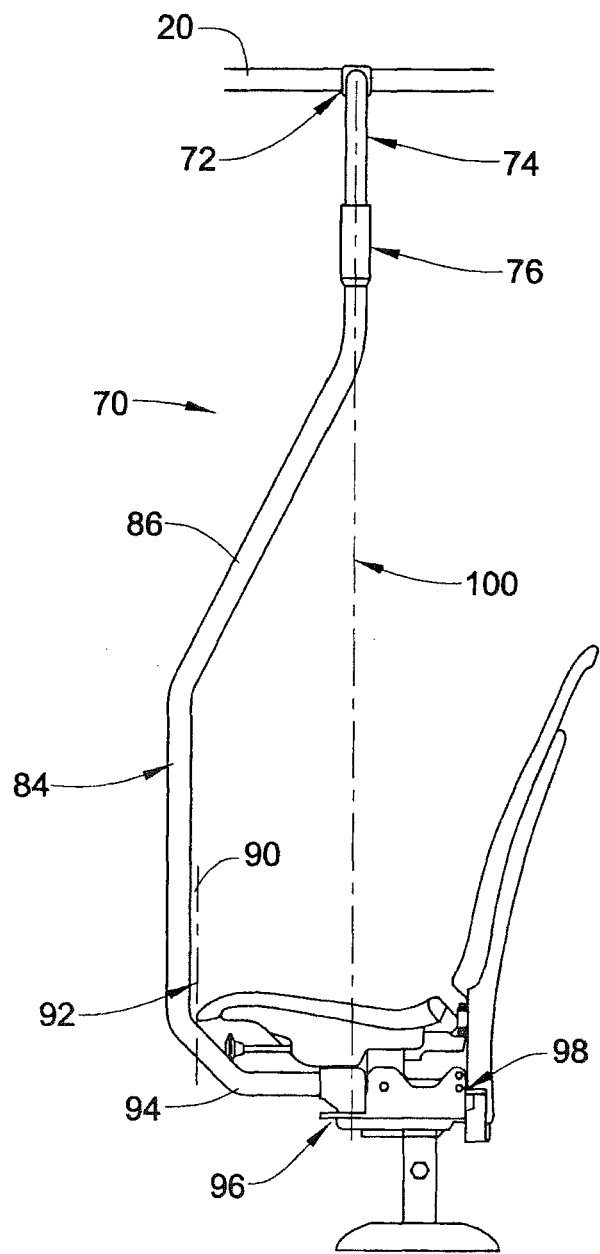
FIG. 24 is a side view of a two-passenger folding seat with a fourth embodiment of a movable stanchion in accordance with the invention.
Figure 25:
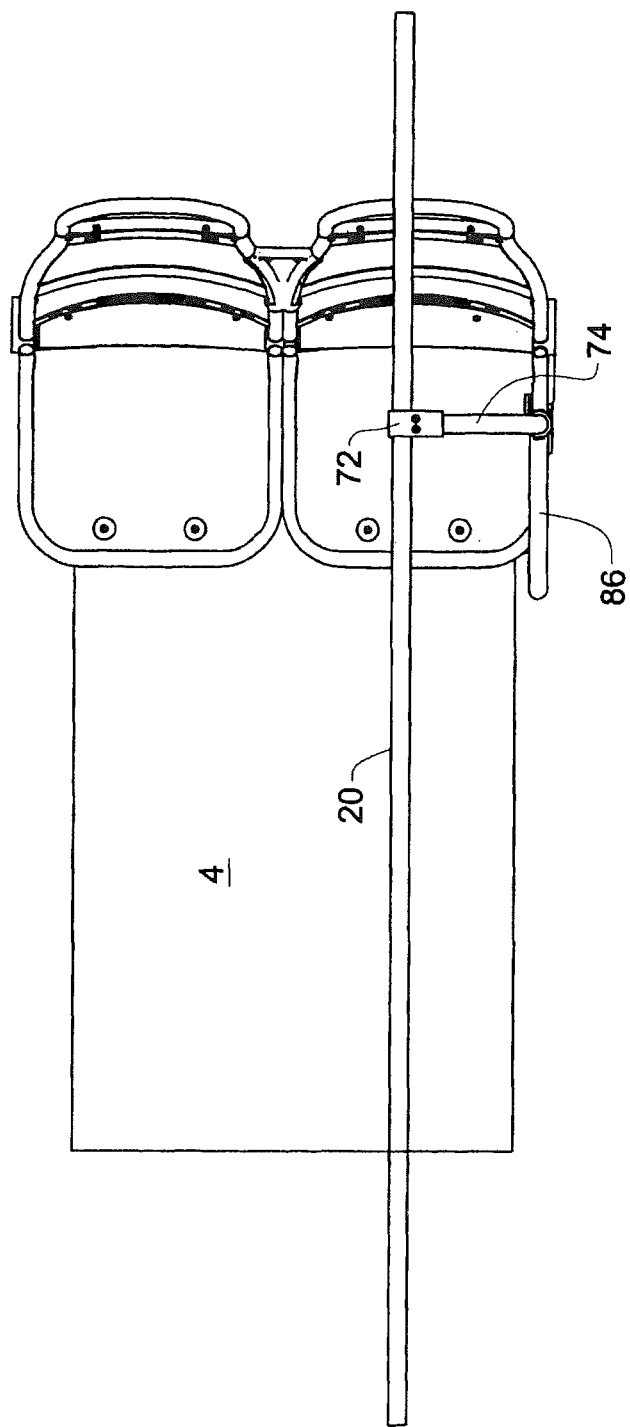
FIG. 25 is a top view of the embodiment of FIG. 24.
Figure 29:
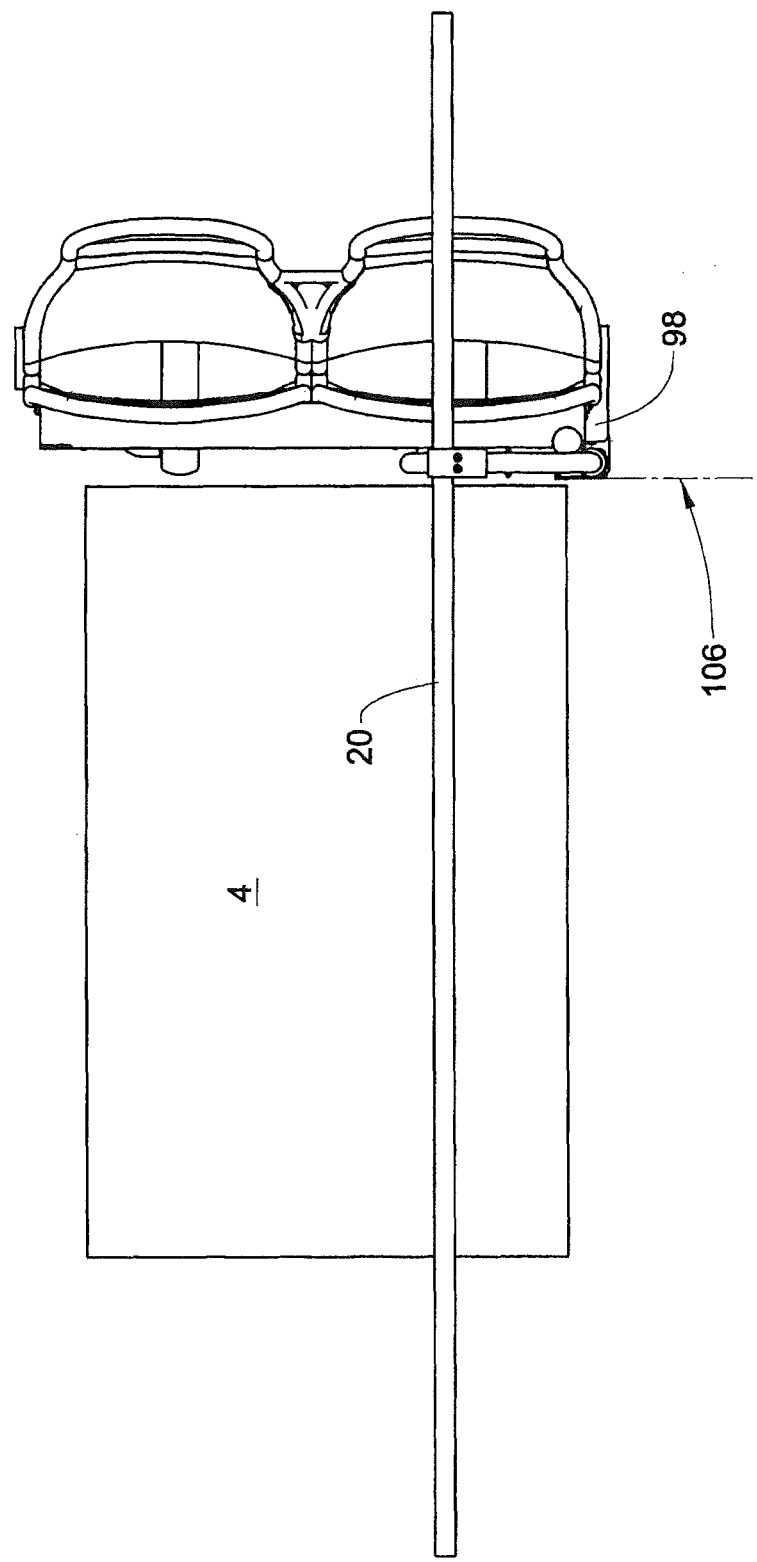
FIG. 29 is a top view of the embodiment of FIG. 24 with the seat folded and the stanchion in a stored position.

It will be appreciated that the bracket 96 of the embodiment illustrated in FIG. 24 can be mounted in different locations, vertically or horizontally. For example, the bracket could be mounted closer or further from the seat, or even on the floor of the vehicle. It is important as shown, however, for the bracket 96 to be aligned horizontally so that it pivots the stanchion about an axis of rotation 100 that is aligned with the collar 76. As well the bracket 96 can be located horizontally in locations closer or further from the location shown as long as it rotates about the axis 100 and remains outside of the wheelchair securement area 4. FIG. 29 illustrates that the bracket 96 and the stanchion are spaced from the securement area by the gap with alignment line 106.

Figure 26:
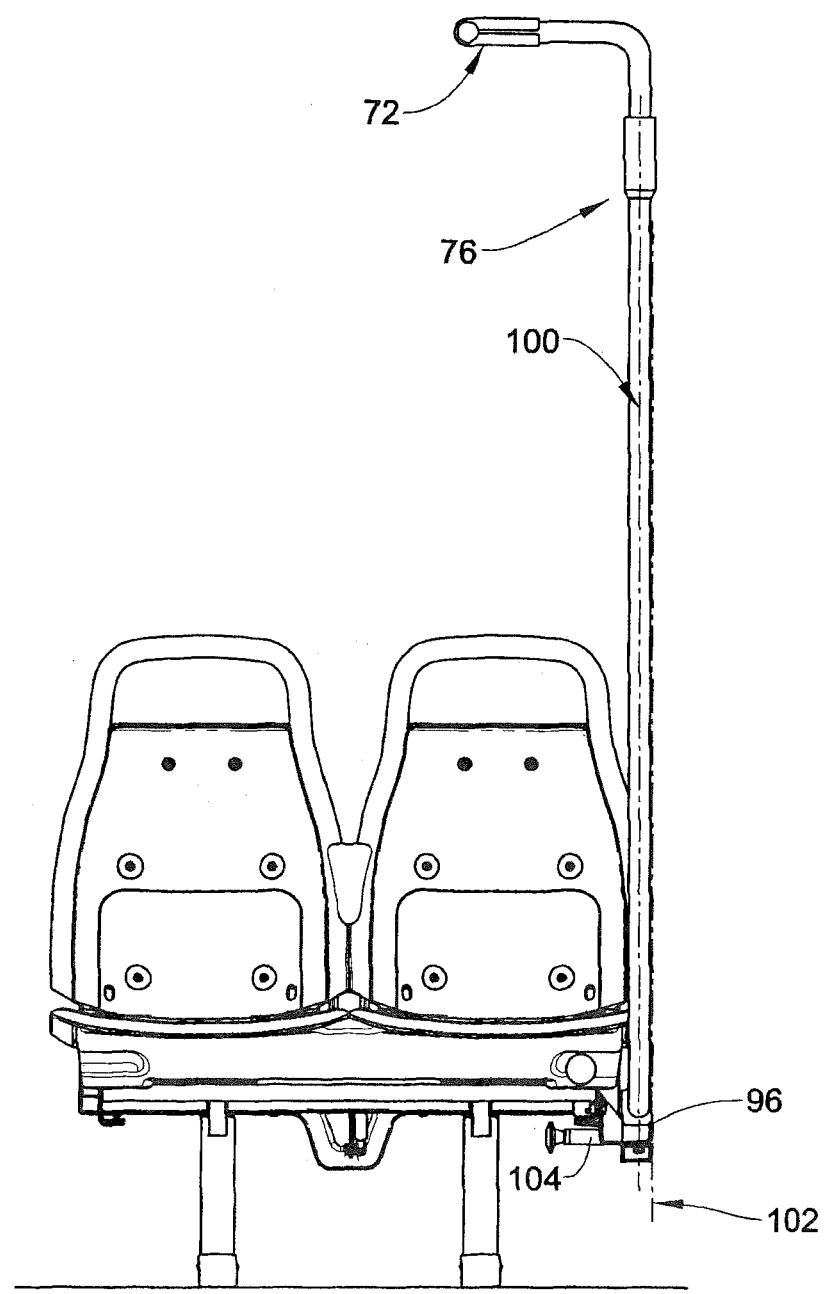
FIG. 26 is a front view of the embodiment of FIG. 24.
Figure 27:
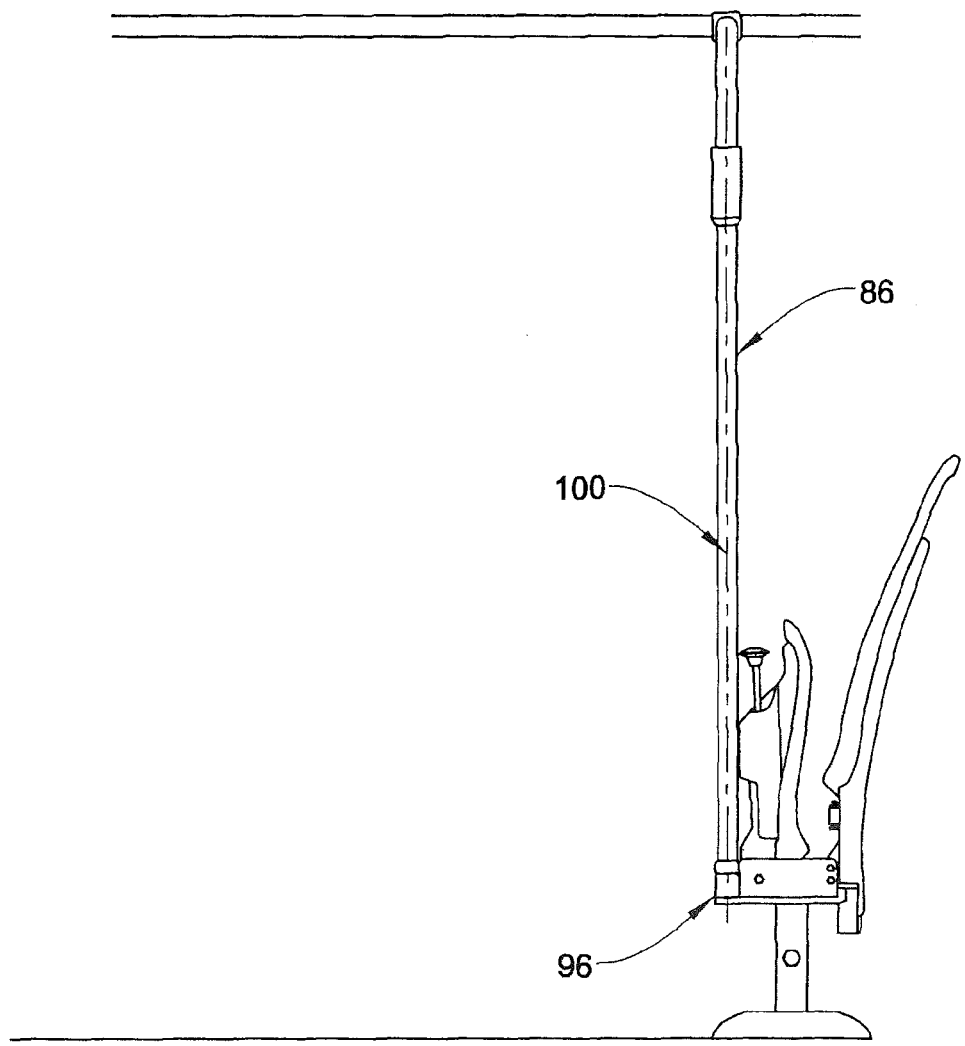
FIG. 27 is a side view of the embodiment of FIG. 24 with the seat folded and the stanchion in a stored position.
Figure 28:
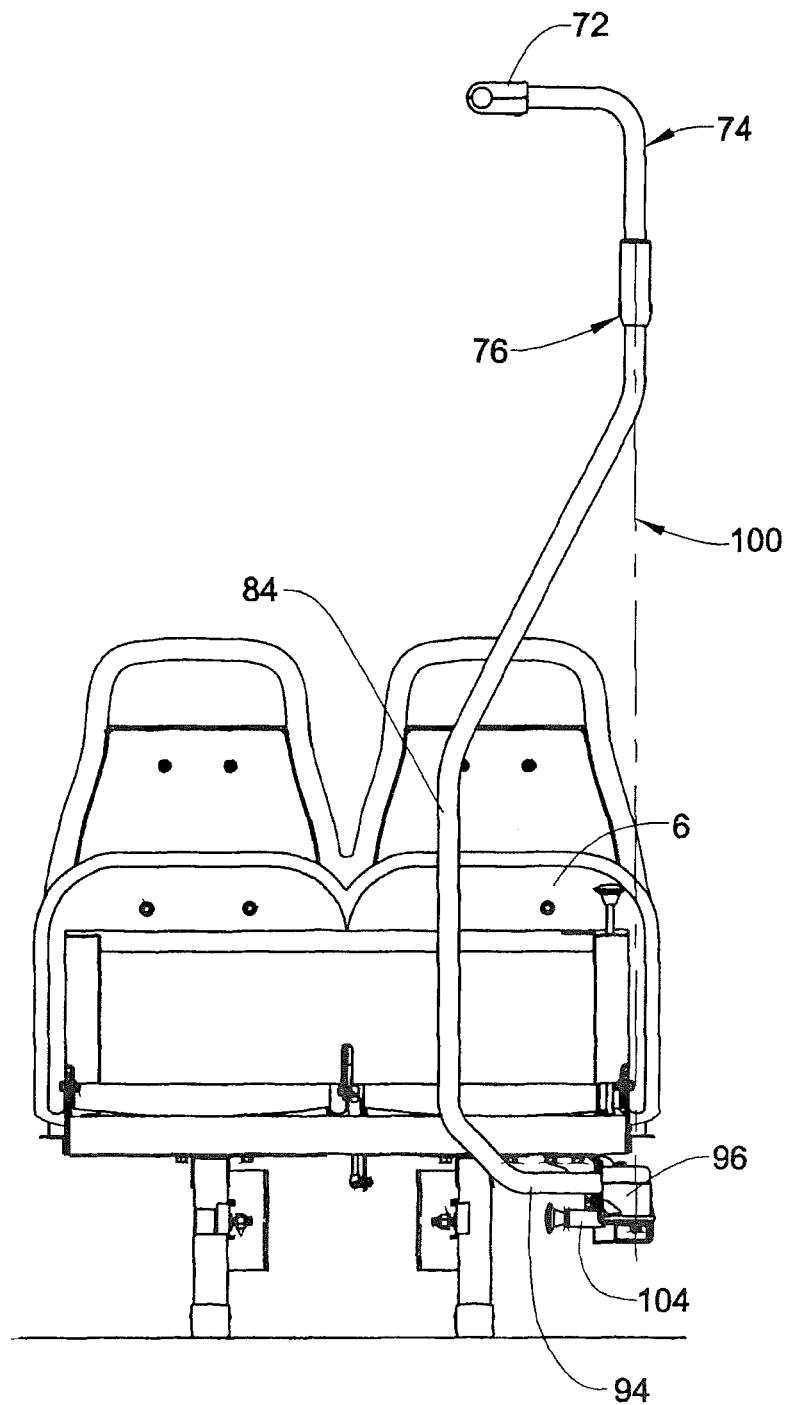
FIG. 28 is a front view of the embodiment of FIG. 24 with the seat folded and the stanchion in a stored position.

FIG. 26 illustrates how the outer edge of the seat and the stanchion are aligned at 102. Also shown is locking mechanism 104 that secures the bracket 96 in a selected position.

FIGS. 30-35 show a further embodiment wherein the lower end 108 of the passenger assist, which is shown as a stanchion 70, is attached below the seat 2. In this embodiment, the lower end 108 is attached to a bracket 110, as further described below, that is not attached to the chair frame and can, optionally, be attached directly to the floor of the vehicle or to other structure located below the chair.

The mounting bracket preferably includes a base 112 on which a holder 114 is pivotally mounted. The holder 114 engages the end 108 of the stanchion and rotates between operational and stored positions whereby the stanchion is also rotated between these positions. The holder can be mounted in any of several ways known in the art, such as a vertical axle mounted in a rectangular box with a locking plate. Preferably, the holder 114 includes a locking mechanism, such as a locking plate, to secure it in a selected one of the operational or stored positions by known mechanisms, and a foot pedal 116 is preferably provided so the operator can release the holder from a locked position with his foot.

Figure 32:
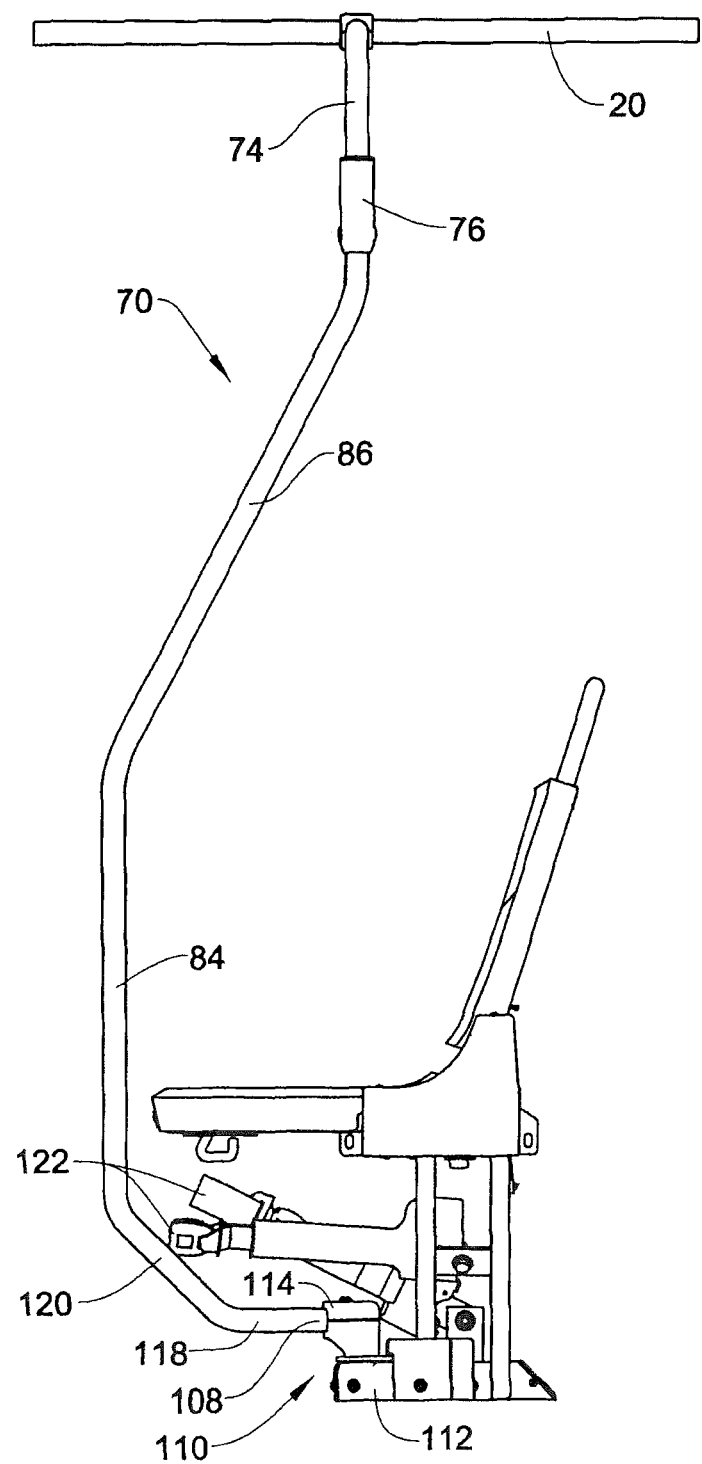
FIG. 32 is a side view of the embodiment of FIG. 30.

FIG. 32 shows a preferred configuration of the stanchion 70 of this embodiment. The lower part of the stanchion can include a first section 118 that extends forwardly beneath the seat generally parallel to the floor, and a second part 120 that extends at an angle to connect to the upright section 84 of the stanchion substantially as illustrated in FIG. 24.

Figure 30:
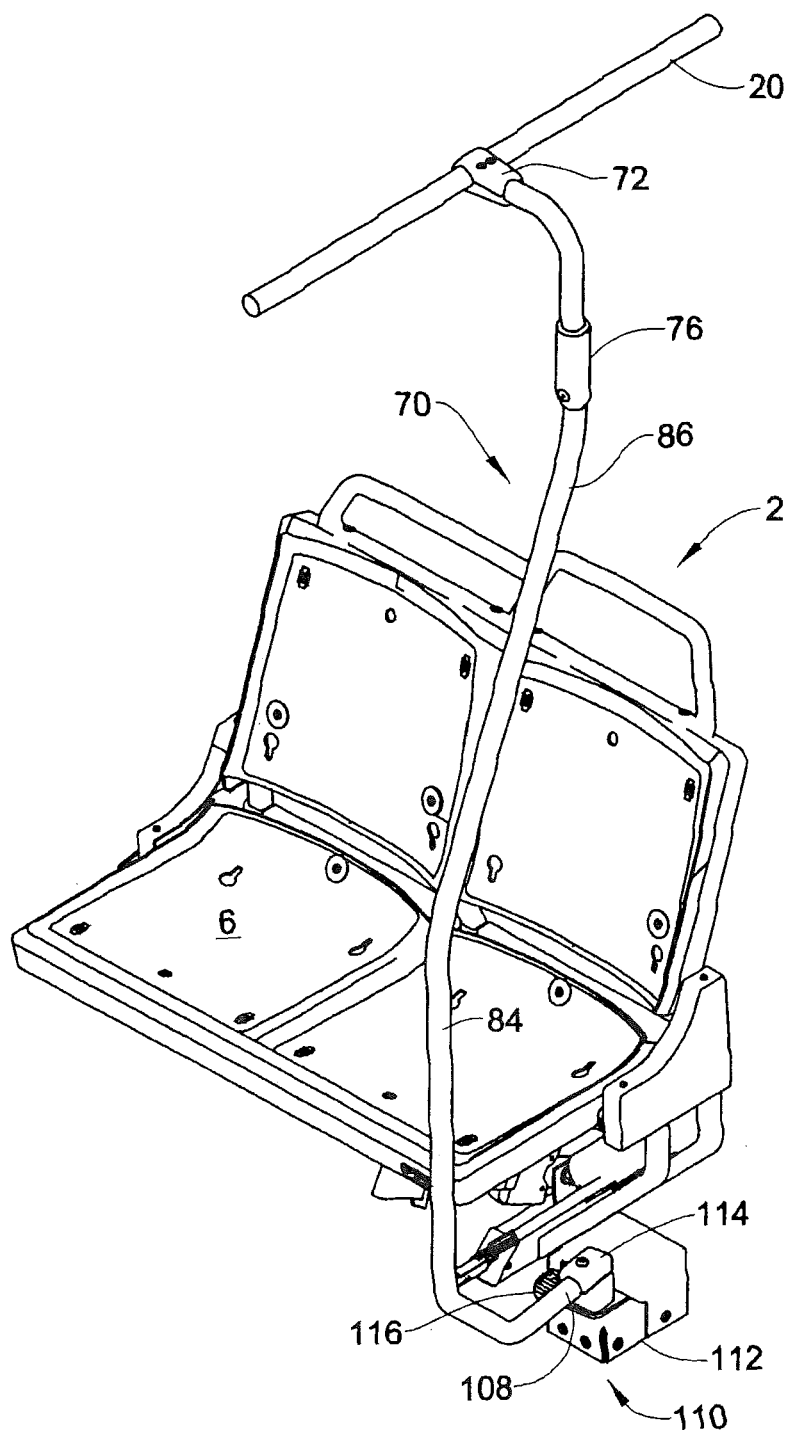
FIG. 30 is a perspective of an embodiment wherein the lower end of the stanchion is mounted to the floor of a vehicle.
Figure 31:
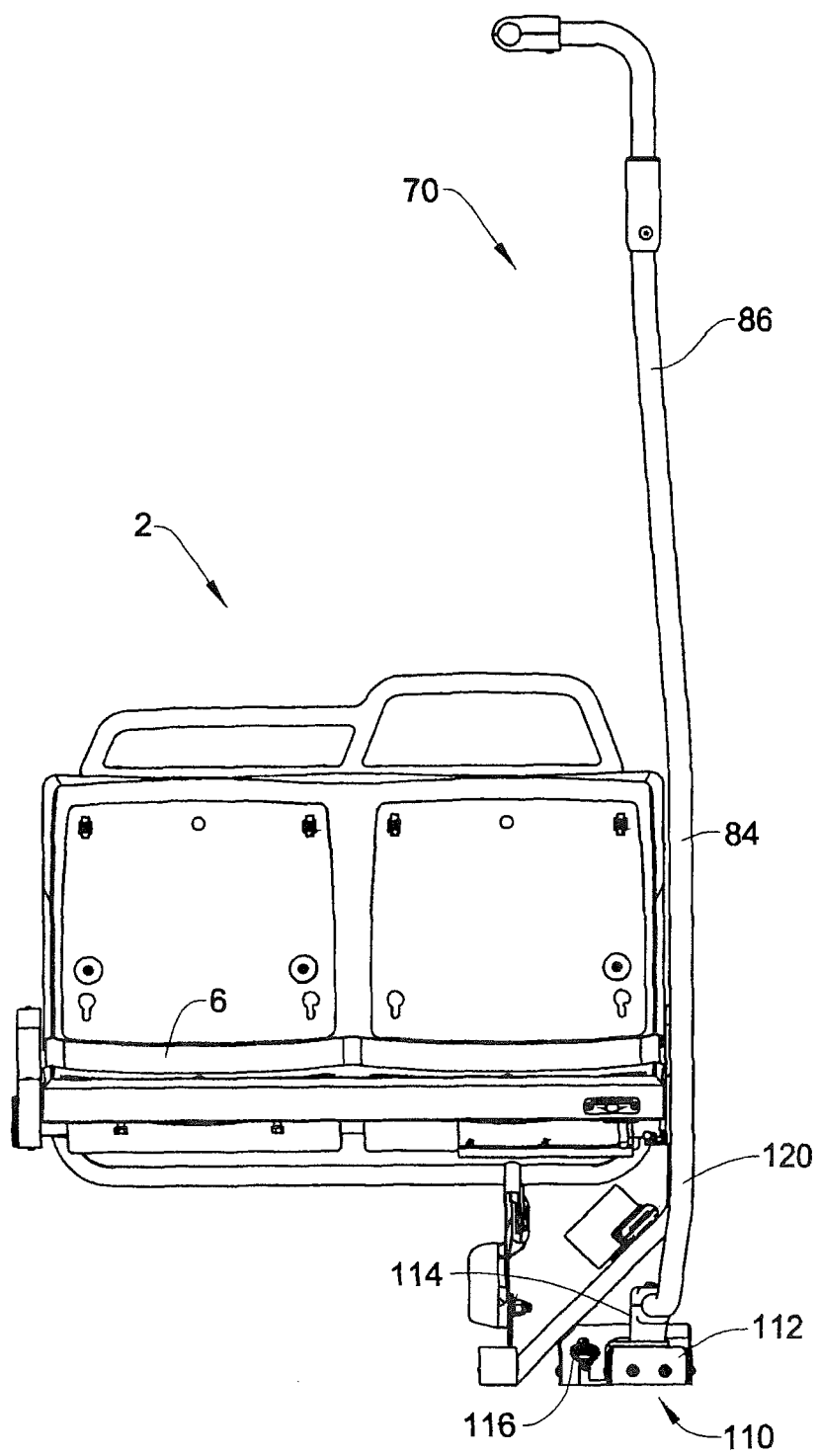
FIG. 31 is a front view of the embodiment of FIG. 30.
Figure 33:
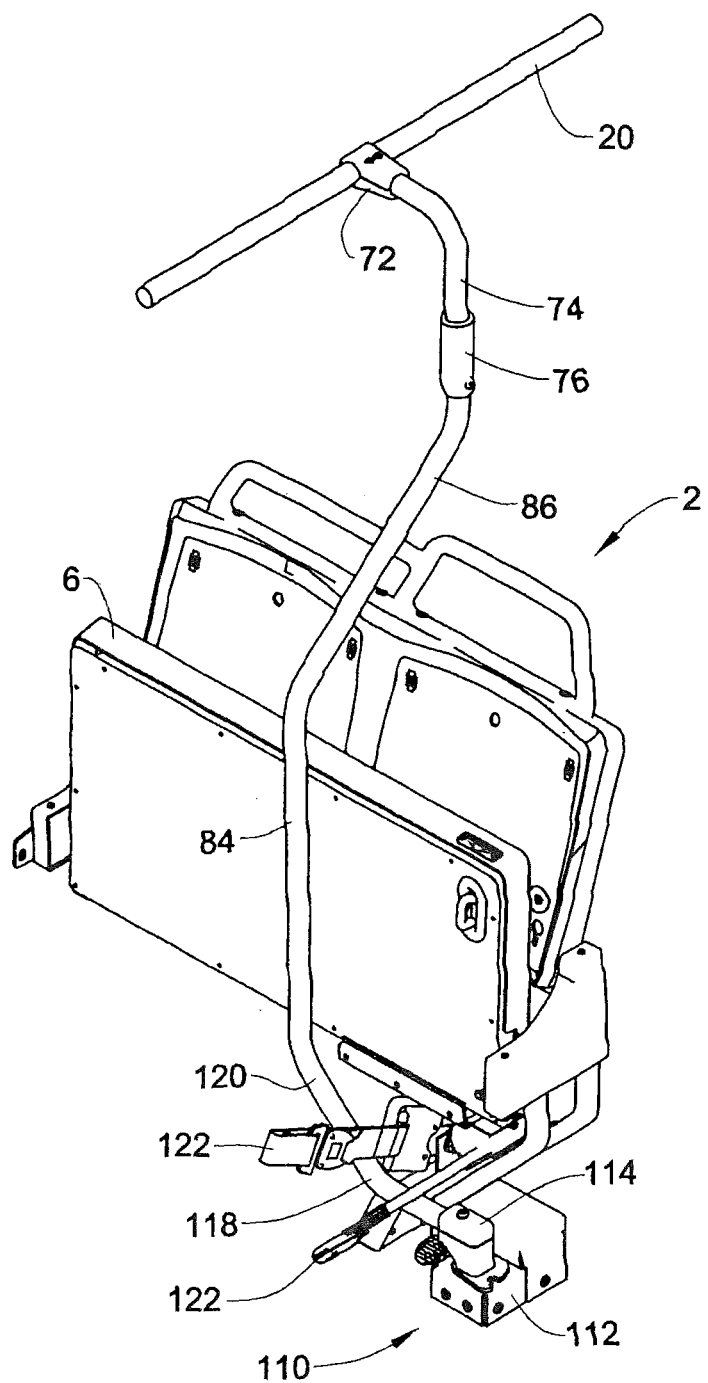
FIG. 33 is a perspective of the embodiment of FIG. 30 with the seat raised and the stanchion in a stored position.
Figure 34:
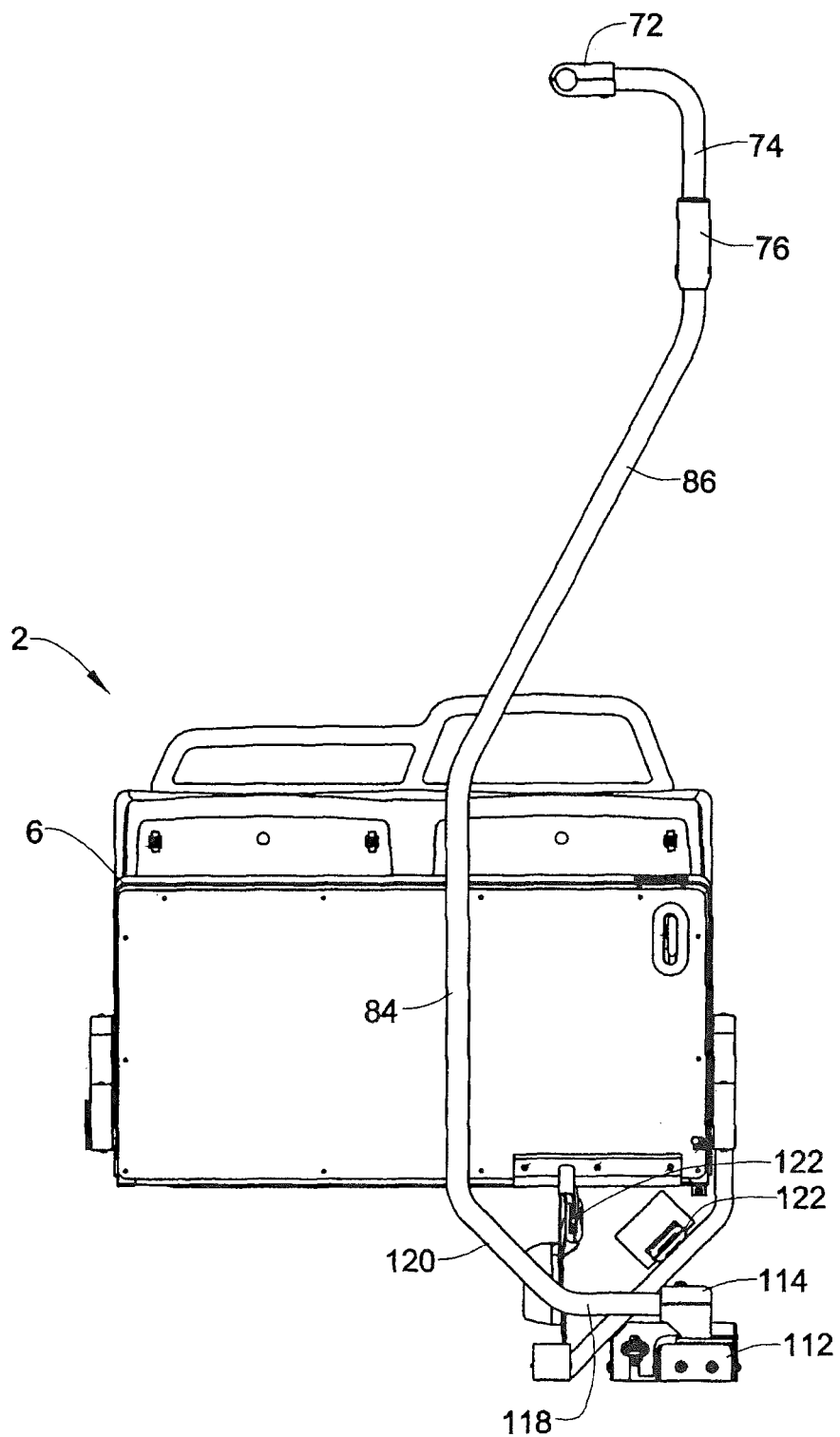
FIG. 34 is a front view of the embodiment of FIG. 30 with the seat raised and the stanchion in a stored position.
Figure 35:
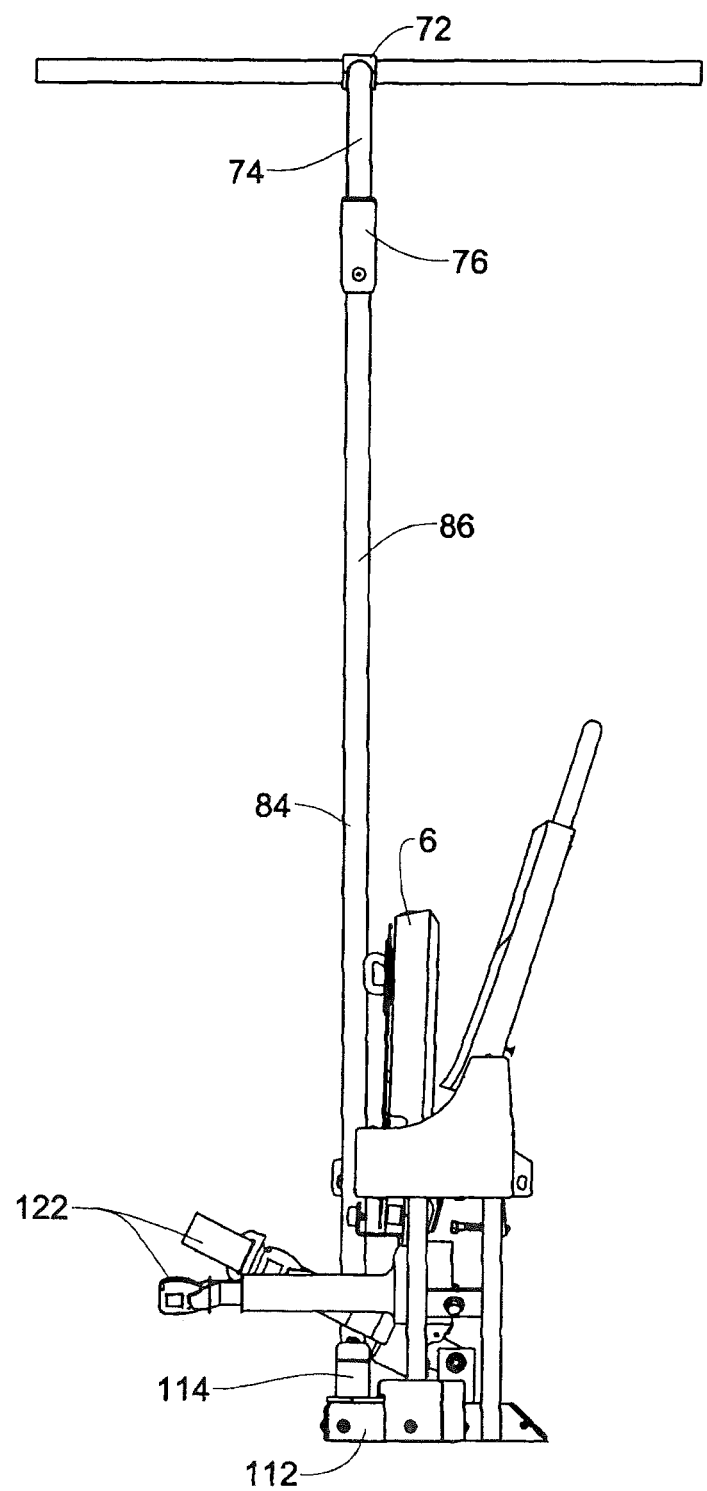
FIG. 35 is a side view of the embodiment of FIG. 30 with the seat raised and the stanchion in a stored position.

FIGS. 33-35 illustrate the embodiment of FIG. 30 when the seat is in a folded position, and the passenger assist is in the storage position. This figure also shows wheelchair and lap belt structures 122, as are known in the art. The location of the bracket 110 and the configuration of the first and second sections of the lower part of the stanchion are such that the passenger assist can be moved to the stored position without interfering with the wheelchair and lap belts 122. Of course other configurations that accomplish this objective can be used.

The above-described embodiments contemplate pivoting (forward or rearward) of the movable stanchion and optional subsequent rotation about the axis of the stanchion to ensure a safe orientation of the lower end when the stanchion is in a stored position. As well the embodiments contemplate rotation of the stanchion about an upright axis. The invention also contemplates the situation where the position of the support bracket on the seat is not vertically aligned with the horizontal rail. In that situation the stanchion can accommodate the offset by, for example, a bend in the stanchion as illustrated. Other techniques are possible, however, such as designing the pivoting joint to accommodate the offset. As well, an attachment with an offset feature could be designed to be attached to the horizontal rail itself.

Moreover, the described mechanical support brackets based on horizontal or vertical motion of the stanchion to engage or disengage have been shown, but the invention contemplates other types of brackets. For example the engagement could involve a rotational connection with the lower part of the station having a rotating element, or the connection could be electrical, magnetic, or the like.

Modifications within the scope of the appended claims will be apparent to those of ordinary skill in the art.

We claim:

1. In a combination comprising:
    a passenger seat adapted to move between a passenger seat first position and a passenger seat second position, wherein when said passenger seat is in said passenger seat first position said passenger seat is oriented to accommodate seated passengers in an area adjacent said passenger seat, and in said passenger seat second position renders said area available for other uses, and a movable passenger assist that in a passenger assist first position is adjacent said passenger seat such that a seated passenger can engage said passenger assist and in a passenger assist second position allows full access to said area, wherein said passenger seat and passenger assist are adapted to be installed in a vehicle, said area is a wheelchair securement area, said movable passenger assist is adapted to be movably attached to said vehicle, said movable passenger assist comprises a stanchion that is oriented generally upright when in said passenger assist first position, and an upper portion of said passenger assist comprises a bracket for attachment to said vehicle.

2. The combination of claim 1 wherein said passenger seat comprises a folding seat bottom upon which said seated passenger can sit, said folding seat bottom being in a horizontal orientation when in said passenger seat first position and being in an upright orientation when in said passenger seat second position.

3. The combination of claim 1 wherein at least part of said passenger assist is attached to said passenger seat.

4. The combination of claim 1 wherein at least a part of said passenger assist is mounted below said passenger seat.

5. The combination of claim 1 wherein said passenger assist is mounted to said vehicle for rotational movement between said first and second positions about a generally horizontal axis.

6. The combination of claim 1 wherein said bracket is configured to attach to a generally horizontal rail that is attached to said vehicle.

7. The combination of claim 1 wherein said bracket is configured to allow said passenger assist to move linearly.

8. The combination of claim 1 wherein said bracket is configured to allow said passenger assist to rotate.

9. The combination of claim 1 wherein said bracket is configured to allow said passenger assist to rotate about a generally longitudinal axis of said passenger assist.

10. The combination of claim 1 wherein said passenger assist in configured to rotate about an upright axis.

11. The combination of claim 10 wherein said upright axis is located behind the front of said passenger seat when said passenger seat is in said passenger seat first position, said passenger assist includes a grab portion that extends forward of said upright axis when said passenger assist is in said passenger assist first position, and said grab portion extends across said passenger seat when said passenger assist is in said passenger assist second position.

12. In a vehicle having a floor wherein said floor provides a dual-use space and an aisle, a passenger seat having a bottom portion for engaging a seated passenger, said bottom portion being movable between a passenger-engaging position for supporting said seated passenger and a stored position, said passenger seat being oriented in said vehicle such that said seated passenger faces said dual-use space and a side of said passenger seat is adjacent said aisle, and a passenger assist adjacent said side of said passenger seat, said passenger assist being movable between a use position and a stored position, wherein said passenger assist in said use position extends forwardly toward said dual-use space to be adjacent said movable bottom portion in said passenger-engaging position and accessible to said seated passenger, said movable bottom portion extends into said dual-use space when said movable bottom portion is in said passenger-engaging position and is remote from said dual-use space when in said stored position, and said passenger assist is remote from said dual-use space when in said stored position.

13. In the vehicle of claim 12 wherein said movable passenger assist comprises a stanchion.

14. In the vehicle of claim 13 wherein said stanchion is generally upright when in said use position and is movable to a generally horizontal stored position.

15. In the vehicle of claim 13 wherein said stanchion is generally upright when in said use position and is movable to a generally upright stored position.

16. In the vehicle of claim 15 wherein said stanchion is rotatable about a generally upright axis to move from said use position to said stored position.

17. In the vehicle of claim 16 wherein said generally upright axis is located outside of said dual-use space.

18. In the vehicle of claim 17 wherein said movable bottom portion rotates upwardly from said passenger-engaging position to said stored position and said stanchion rotates to said stored location wherein at least a portion of said stanchion extends across said movable bottom portion in said stored position.

19. In the vehicle of claim 16 wherein at least a part of said stanchion is mounted to said passenger seat.

20. In the vehicle of claim 16 wherein at least a part of said stanchion is mounted to said floor.

21. In the vehicle of claim 16 wherein at least a part of said stanchion is mounted to a horizontal rail attached to said vehicle.

22. In the vehicle of claim 12 wherein said dual-use space is a wheelchair securement area.

23. In a vehicle having a folding transverse seat facing a forward direction of motion of the vehicle, the folding seat being adjacent a dual-use space and having a bottom portion that pivots between a bottom-portion storage position and a bottom-portion use position, said bottom portion accommodating a seated passenger when in said bottom-portion use position, at least an end portion of said bottom portion extending into said dual-use space when in said bottom-portion use position, and said bottom portion being removed from said dual-use space when in said bottom-portion storage position, the improvement comprising a movable passenger assist adjacent an aisle end of said folding seat and having a passenger-accessible part adjacent said end portion of said bottom portion that is accessible to said seated passenger when in a passenger assist use position and remote from said dual-use space when in a passenger assist storage position.

24. In the vehicle of claim 23 wherein said movable passenger assist is a stanchion.

25. In the vehicle of claim 23 wherein said movable passenger assist is movable about a generally horizontal axis.

26. In the vehicle of claim 23 wherein said movable passenger assist is movable about an upright axis.

27. In the vehicle of claim 23 wherein said dual-use space is a wheelchair securement area.

* * * * *